United States Patent
Sue et al.

(10) Patent No.: US 12,412,248 B2
(45) Date of Patent: Sep. 9, 2025

(54) SYSTEMS AND METHODS FOR PROCESSING ELECTRONIC IMAGES WITH PREANALYTIC ADJUSTMENT

(71) Applicant: PAIGE.AI, Inc., New York, NY (US)

(72) Inventors: Jillian Sue, New York, NY (US); Matthew Lee, London (GB); Christopher Kanan, Pittsford, NY (US)

(73) Assignee: Paige.AI, Inc., New York, NY (US)

( * ) Notice: Subject to any disclaimer, the term of this patent is extended or adjusted under 35 U.S.C. 154(b) by 538 days.

(21) Appl. No.: 17/954,490

(22) Filed: Sep. 28, 2022

(65) Prior Publication Data
US 2023/0115448 A1   Apr. 13, 2023

Related U.S. Application Data

(60) Provisional application No. 63/254,597, filed on Oct. 12, 2021.

(51) Int. Cl.
| | | |
|---|---|---|
| *G06T 5/50* | (2006.01) | |
| *G06T 7/00* | (2017.01) | |
| *G06T 7/10* | (2017.01) | |
| *G06T 7/70* | (2017.01) | |

(52) U.S. Cl.
CPC .............. *G06T 5/50* (2013.01); *G06T 7/0012* (2013.01); *G06T 7/10* (2017.01); *G06T 7/70* (2017.01); *G06T 2207/20081* (2013.01); *G06T 2207/20084* (2013.01); *G06T 2207/30004* (2013.01); *G06T 2207/30168* (2013.01)

(58) Field of Classification Search
None
See application file for complete search history.

(56) References Cited

U.S. PATENT DOCUMENTS

2023/0024468 A1\*  1/2023  Robert ................ G06V 10/774
2024/0193729 A1\*  6/2024  Carrillo-Perez ...... G06T 3/4053

FOREIGN PATENT DOCUMENTS

WO      2020182710 A1    9/2020

OTHER PUBLICATIONS

Sophia J. Wagner et al., "Structure-Preserving Multi-Domain Stain Color Augmentation using Style-Transfer with Disentangled Representations" Jul. 26, 2021), "Technical University Munich", Munich Germany (Year: 2021)\*
Dey, Ayon. "Machine Learning Algorithms: A Review." International Journal of Computer Science and Information Technologies, vol. 7, No. 3, May 3, 2016.
(Continued)

*Primary Examiner* — Dov Popovici
(74) *Attorney, Agent, or Firm* — Bookoff McAndrews, PLLC

(57) ABSTRACT

A method for processing electronic medical images may include receiving an initial whole slide image of a pathology specimen, receiving information about slide quality aspects to modify, and generating a synthetic whole slide image by applying a machine learning model to modify the received initial whole slide image according to the received information. The pathology specimen may be associated with a patient. The synthetic whole slide image may have a reduced quality as compared to the initial whole slide image.

20 Claims, 14 Drawing Sheets

(56) References Cited

OTHER PUBLICATIONS

Schömig-Markiefka, Birgid, et al. "Quality control stress test for deep learning-based diagnostic model in digital pathology." Modern Pathology, Nature Publishing Group, GB, 34.12, pp. 2098-2108, Jun. 24, 2021.

Wagner, Sophia J., et al. "Structure-Preserving Multi-Domain Stain Color Augmentation Using Style-Transfer with Disentangled Representations." 16th European Conference Computer Vision ECCV 2020, Cornell University Library, 201 Olin Library Cornell University, Ithaca, NY, 14853, pp. 257-266, Sep. 21, 2021.

Wei, Jerry, et al. "Difficulty Translation in Histopathology Images." Pattern Recognition: 5th Asian Conference, ACPR 2019, Auckland, New Zealand, Nov. 26-29, 2019, Revised Selected Papers, Part II; [Lecture Notes in Computer Science], Springer International Publishing, Cham, pp. 238-248, [Retrieved Sep. 26, 2020.].

\* cited by examiner

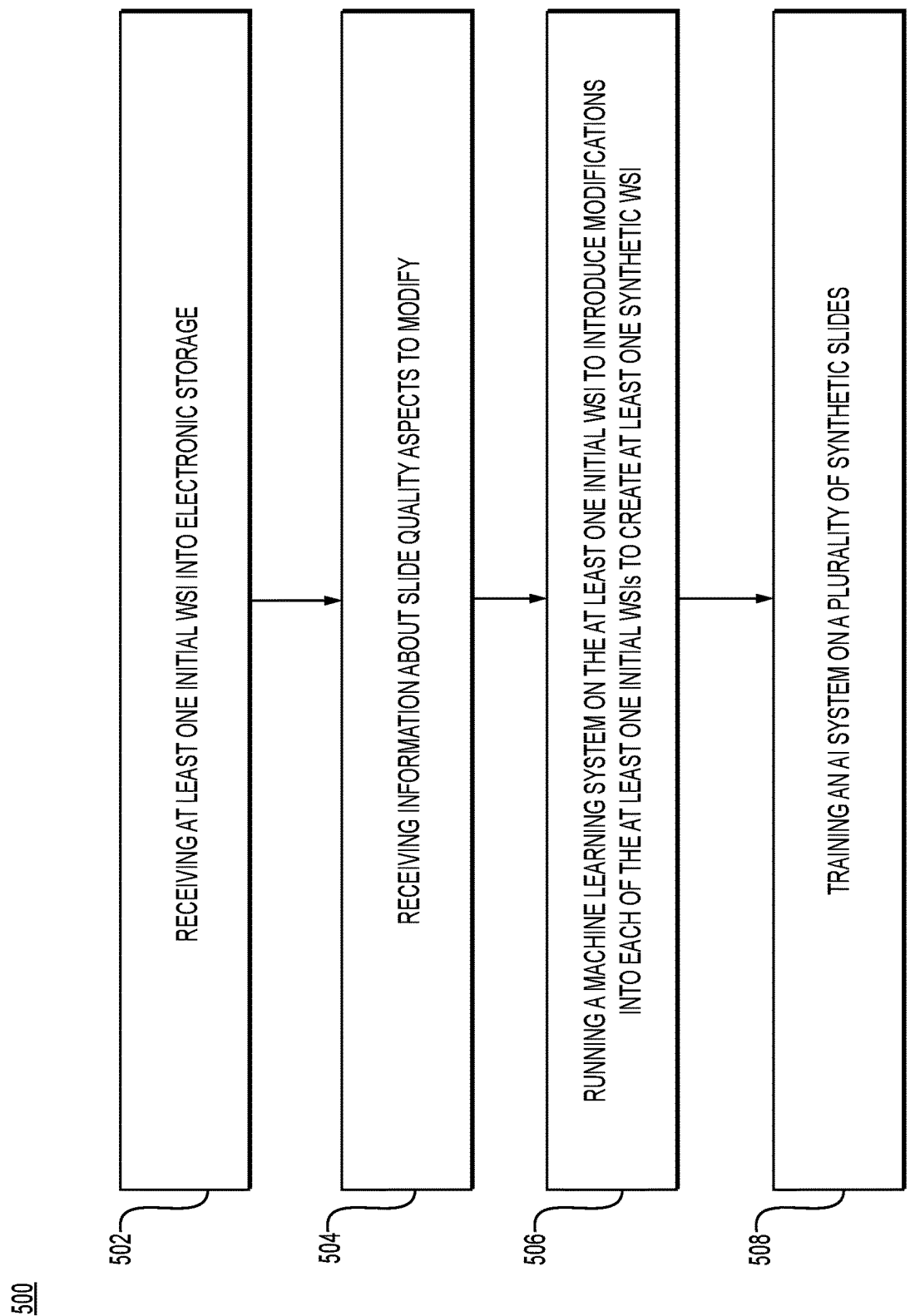

SYSTEMS AND METHODS FOR PROCESSING ELECTRONIC IMAGES WITH PREANALYTIC ADJUSTMENT

RELATED APPLICATION(S)

This application claims priority to U.S. Provisional Application No. 63/254,597 filed Oct. 12, 2021, the entire disclosure of which is hereby incorporated herein by reference in its entirety.

FIELD OF THE DISCLOSURE

Various embodiments of the present disclosure pertain generally to image processing methods. More specifically, particular embodiments of the present disclosure relate to systems and methods for histologic data augmentation and preanalytic adjustment.

BACKGROUND

Preanalytics refers to steps or processes taken to ensure the quality and standardization of glass slides and their digitization. Pathology relies on effective preparation of glass slides for diagnosis; however, there are many ways diagnosis could be erroneous. For example, the slide could be cut too thickly, making it impossible for a pathologist to diagnose disease. Alternatively, a stain cocktail used could be deficient.

Moreover, even when these preanalytics procedures are consistent in a given lab, norms may vary across labs and geographic locales. Other forms of artifacts or unwanted structures could impair the quality of a slide, such as stray hair getting under or on the glass during preparation and a presence of air bubbles and fingerprints. Blood could also be present in excess quantities, which could pose an additional impediment to clinical review. These problems may occur during physical preparation of the slide; however digital pathology poses even more problems. For example, scanning slides to create whole slide images (WSIs) may introduce additional potential pitfalls, such as blur or scan lines.

Preanalytic quality control may involve proper preparation of slides, including cutting tissue at a correct thickness, staining a slide correctly, and ensuring there are no artifacts that impair diagnosis. With digital pathology, preanalytic quality control may involve proper scanning of slides, with artifacts such as scan lines and blur kept to a minimum. Ordinarily, correcting these issues requires repreparing a slide or rescanning it, which may be infeasible.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the present disclosure, systems and methods are disclosed for processing electronic medical images and making prenalytic adjustments. In one aspect, a computer-implemented method for processing electronic medical images is disclosed. The method may include receiving an initial whole slide image of a pathology specimen, receiving information about slide quality aspects to modify, and generating a synthetic whole slide image by applying a machine learning model to modify the received initial whole slide image according to the received information. The pathology specimen may be associated with a patient. The synthetic whole slide image may have a reduced quality as compared to the initial whole slide image.

Receiving information about slide quality aspects to modify may include receiving information about a desired artifact, hair artifact, crack, bubble, crack, bubble, dust, dirt, ink scanline, fold, scratch, slice thickness, stain intensity, slide clarity, fixation quality, and/or slide color.

Receiving an initial whole slide image may include receiving a plurality of initial whole slide images. Generating the synthetic whole slide image may include generating a plurality of synthetic whole slide images. The method may further include training a diagnostic machine learning system using the plurality of synthetic whole slide images.

Receiving information about slide quality aspects to modify may include receiving at least one target whole slide image. The target whole slide image may have at least one predetermined defect.

Generating the synthetic whole slide image by applying the machine learning model may include using a pre-trained neural network to apply neural style transfer to transform the initial whole slide image into the generated whole slide image such that the generated whole slide image includes the predetermined defect.

Receiving information about slide quality aspects to modify may include receiving at least one pixel-wise annotation with the at least one target whole slide image. The pixel-wise annotation may be indicative of an artifact location in the target whole slide image.

Generating the synthetic whole slide image by applying the machine learning model may include segmenting the artifact and introducing the segmented artifact into the initial whole slide image. The method may include modifying the segmented artifact. The method may include determining one or more locations of the initial whole slide image to introduce the artifact.

Receiving information about slide quality aspects to modify may include receiving at least one target variable indicative of a predetermined defect.

Generating the synthetic whole slide image by applying the machine learning model may include using a pre-trained neural network to apply conditional image augmentation to transform the initial whole slide image into the generated whole slide image such that the generated whole slide image includes the predetermined defect.

The method may include determining at least one salient diagnostic area of interest on the received initial whole slide image, and determining whether the generated synthetic whole slide image has a sufficient quality for use in a primary diagnosis.

The method may include categorizing the generated synthetic whole slide image by tissue type, stain type, diagnosis, quality, or a type of defect or artifact introduced.

Receiving information about slide quality aspects to modify may include receiving information about a site's specimen transfer and/or slide preparation protocol.

Receiving information about slide quality aspects to modify may include receiving information about a condition. Generating the synthetic whole slide image by applying the machine learning model may include repeatedly modifying the initial whole slide image until the condition is satisfied. The method may include determining a measure of generalization of the received initial whole slide image based on an extent of modifications performed to satisfy the condition.

The method may include running a diagnostic system on the generated synthetic whole slide image to determine a diagnosis or a salient diagnostic area of interest, and determining one or more performance characteristics of the diagnostic system based on a determination by the diagnostic system.

The method may include outputting the generated whole slide image to electronic storage and/or a display.

In another aspect, a system for processing electronic medical images is disclosed. The system may include at least one memory storing instructions and at least one processor configured to execute the instructions to perform operations. The operations may include receiving an initial whole slide image of a pathology specimen, the pathology specimen being associated with a patient, receiving information about slide quality aspects to modify, and generating a synthetic whole slide image by applying a machine learning model to modify the received initial whole slide image according to the received information. The synthetic whole slide image may have a reduced quality as compared to the initial whole slide image.

In yet another aspect, a non-transitory computer-readable medium storing instructions is disclosed. When the instructions are executed by a processor, the instructions may perform operations processing electronic medical images. The operations may include receiving an initial whole slide image of a pathology specimen, the pathology specimen being associated with a patient, receiving information about slide quality aspects to modify, and generating a synthetic whole slide image by applying a machine learning model to modify the received initial whole slide image according to the received information. The synthetic whole slide image may have a reduced quality as compared to the initial whole slide image.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 5 is an exemplary flow chart illustrating a process for creating at least one synthetic whole slide image (WSI) using information about slide quality aspects and training a system, according to an exemplary embodiment of the present disclosure.

DESCRIPTION OF THE EMBODIMENTS

Figure 1A:
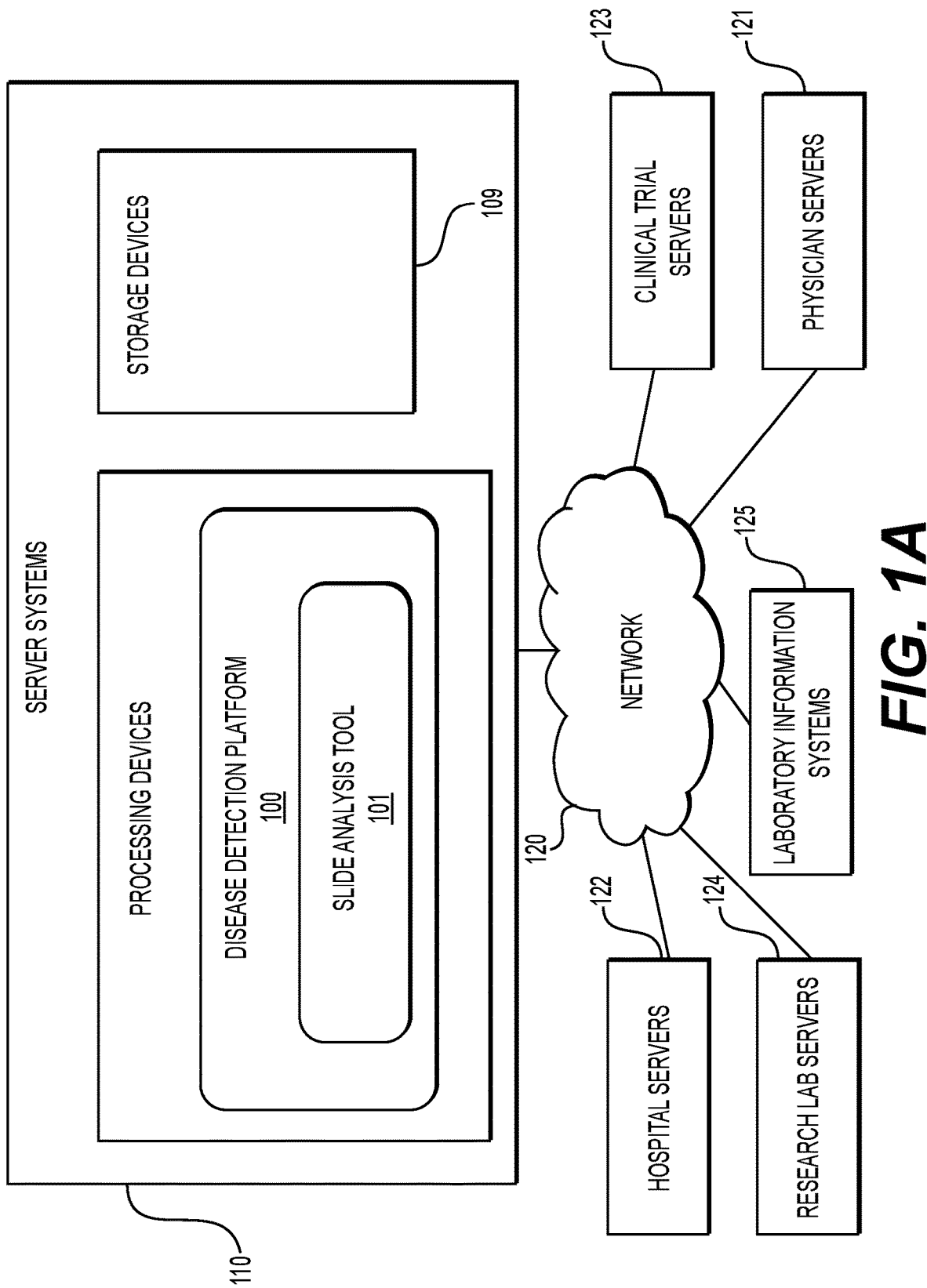
FIG. 1A illustrates an exemplary block diagram of a system and network to synthetically augment or modify digital or electronic slide images to change slide quality, according to an exemplary embodiment of the present disclosure.

Reference will now be made in detail to the exemplary embodiments of the present disclosure, examples of which are illustrated in the accompanying drawings. Wherever possible, the same reference numbers will be used throughout the drawings to refer to the same or like parts.

The systems, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these devices, systems, or methods unless specifically designated as mandatory.

Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

As used herein, the term "exemplary" is used in the sense of "example," rather than "ideal." Moreover, the terms "a" and "an" herein do not denote a limitation of quantity, but rather denote the presence of one or more of the referenced items.

The present disclosure describes how artificial intelligence (AI) may be used to augment histologic data and assist preanalytic adjustment. Methods and system disclosed herein may address problems in preanalytics by using AI to synthetically adjust a scanned slide image to improve or degrade a quality of the digital image, which may have multiple applications. Techniques disclosed herein may use AI to create synthetic preanalytic variations in histopathology slides.

Preanalytic quality control involves proper preparation of slides and proper scanning of slides. No artificial and accurate mechanism currently exists to simulate preanalytical variations (e.g., air bubbles, thick tissue sections, overstaining, fingerprints, etc.) in histopathological tissue preparation and staining. Current industry practice does not include a real standard for simulating tissue preparation variation. Most augmentation and normalization mechanisms focus on color space, rotations, image cropping, or blur.

Techniques disclosed herein may augment images in a realistic fashion to mimic effects of preanalytic variables such as a staining method, slice thickness, presence of bubbles, and/or presence of artifacts.

AI systems may become robust to slide quality aspects. Generally, for this to occur, the AI systems must be exposed to slide quality aspects with sufficient frequency. If a system is trained on WSIs from a laboratory that has very good preanalytics, low quality slides exhibiting the aforementioned issues may be rare. When these systems are used on data from other locations where preanalytic slide preparation is not as consistent, the system may perform poorly.

One solution to this problem would be to train an AI system on data from multiple sites; however, this training might not be possible when data distribution among sites do not match. This mismatching and/or lack of training may reduce a system's exposure to and/or ability to gain enough robustness across a range of preparations for a slide. For example, one may have a very large amount of data from one site but only a small amount of data from another, leading the system to fail to gain robustness or leading the system to learn a task incorrectly.

Techniques disclosed herein may enable slides to be adjusted by synthetically adjusting a quality of the slides. Techniques disclosed herein may use AI to synthetically or virtually adjust a thickness of the sample and to synthetically or virtually introduce artifacts. These synthetic slides may then be used as a form of data augmentation when training an AI system to improve its robustness to or recognition of the artifacts, in addition to other useful embodiments.

Some techniques are not able to synthetically generate realistic problems such as cracks, bubbles, scanlines, and tissue thickness, and are instead limited to random adjustment of color properties, brightness, and other low-level image characteristics.

While developing biomarker applications where data is scarce, a need for technology that can augment data beyond image-based techniques was identified. When trying to develop AI for unique patient cohorts, combining data from various sources may be important or critical. However, when the data comes from different labs with disparate tissue preparation and staining protocols, AI systems may be inclined to learn a difference between these data sources, rather than actual histological features. Additionally, AI systems trained on diverse data that accounts for potential variations may be more likely to generalize to unseen data.

An AI slide quality augmentation system may quantify and synthesize preanalytic scenarios that may be encountered in pathology. The AI slide quality augmentation system may create synthetic WSIs that have desired or predetermined artifacts. Potential artifacts that such a system could add, remove, increase, or decrease for a given whole slide image or region include: tissue folds, bubbles, cracks/knife shatters, dust, scratches, thick tissue, overstaining of hematoxylin (h), under staining of eosin (e) or vice versa, floaters, ink markings, pen, fingerprint, cover slip issues (e.g., edges, cracks), poor tissue processing, tissue outside coverslip, barcode overlaps into scanning region, barcode failures, additional and/or wrong and/or alien tissue (e.g. from the cut before), excessive blood, etc.

The system may synthesize both local and global changes in slides. Global and local algorithms may be run in sequence in order to adjust both the global and local characteristics of a slide.

Figure 1B:
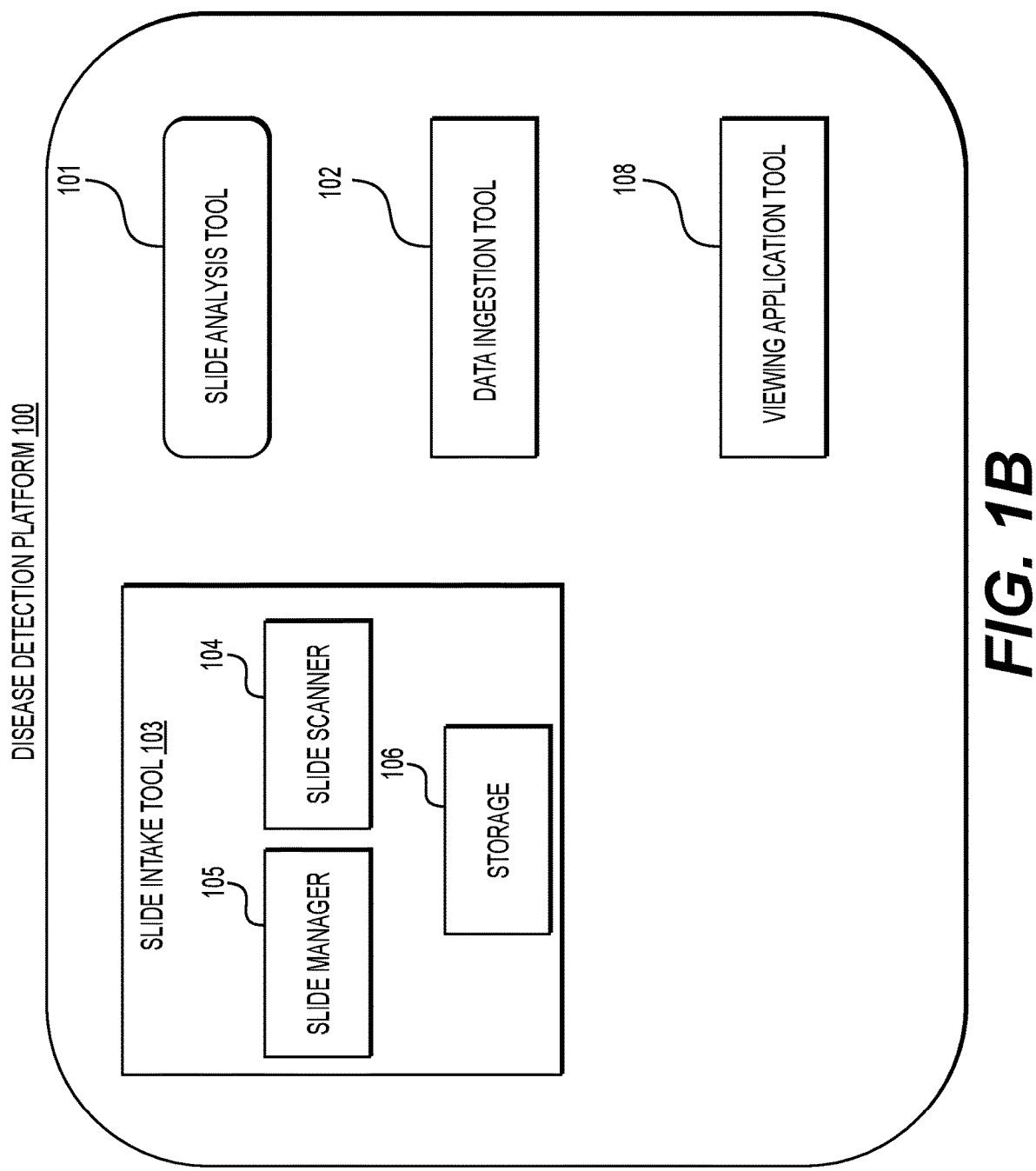
FIG. 1B illustrates an exemplary block diagram of a disease detection platform, according to an exemplary embodiment of the present disclosure.
Figure 1C:
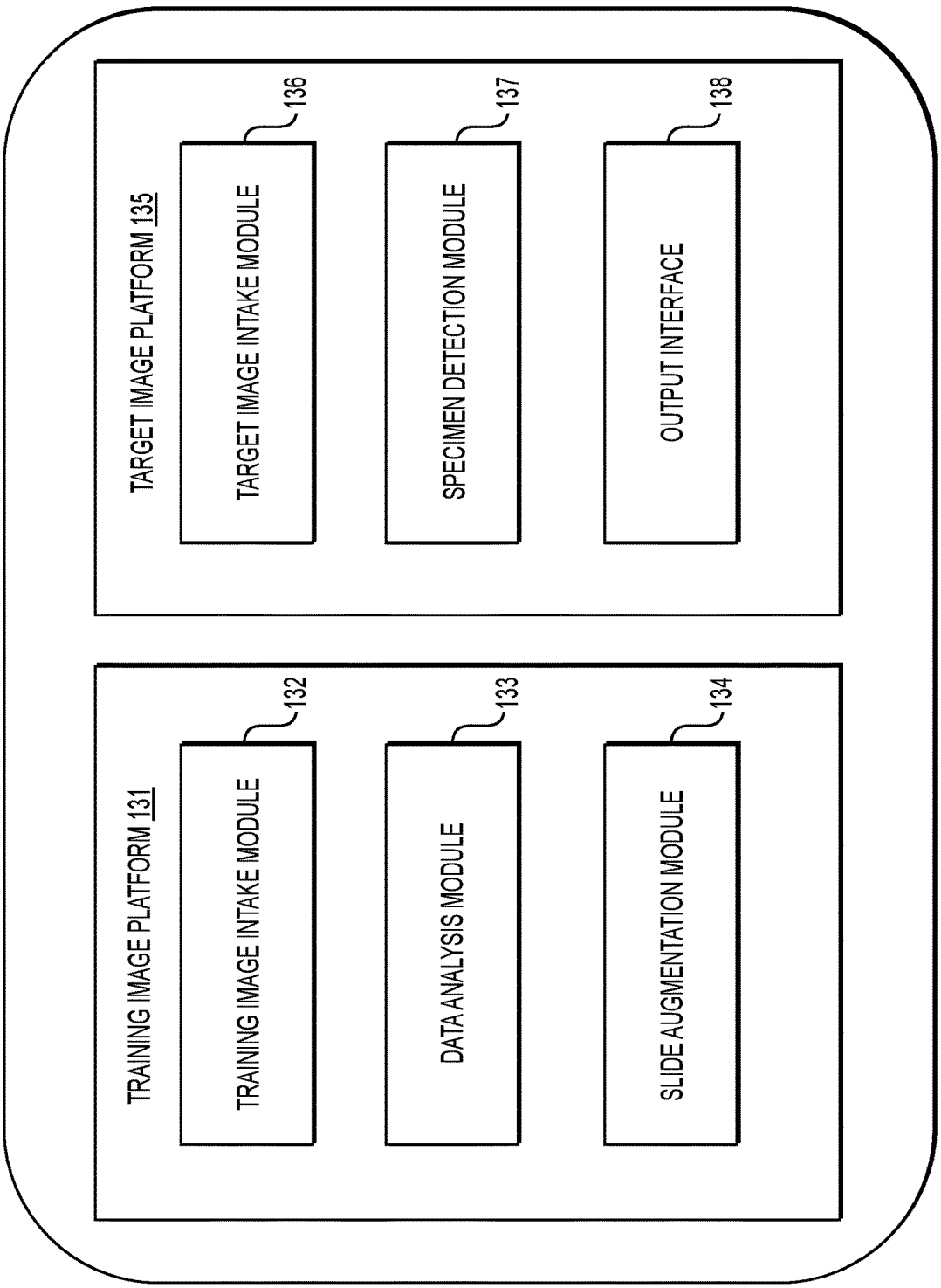
FIG. 1C illustrates an exemplary block diagram of a slide analysis tool, according to an exemplary embodiment of the present disclosure.

FIGS. 1A through 1C show a system and network to synthetically augment or modify digital slide images and/or to change a perceived slide quality, according to an exemplary embodiment of the present disclosure.

Specifically, FIG. 1A illustrates an electronic network 120 that may be connected to servers at hospitals, laboratories, and/or doctor's offices, etc. For example, physician servers 121, hospital servers 122, clinical trial servers 123, research lab servers 124, and/or laboratory information systems 125, etc., may each be connected to an electronic network 120, such as the Internet, through one or more computers, servers and/or handheld mobile devices. According to an exemplary embodiment of the present application, the electronic network 120 may also be connected to server systems 110, which may include processing devices that are configured to implement a disease detection platform 100, which includes a slide analysis tool 101 for determining specimen property or image property information pertaining to digital pathology image(s), and using machine learning to determine whether a disease or infectious agent is present, according to an exemplary embodiment of the present disclosure. The slide analysis tool 101 may allow for rapid evaluation of 'adequacy' in liquid-based tumor preparations, facilitate the diagnosis of liquid based tumor preparations (cytology, hematology/hematopathology), and predict molecular findings most likely to be found in various tumors detected by liquid-based preparations.

The physician servers 121, hospital servers 122, clinical trial servers 123, research lab servers 124 and/or laboratory information systems 125 may create or otherwise obtain images of one or more patients' cytology specimen(s), histopathology specimen(s), slide(s) of the cytology specimen(s), digitized images of the slide(s) of the histopathology specimen(s), or any combination thereof. The physician servers 121, hospital servers 122, clinical trial servers 123, research lab servers 124 and/or laboratory information systems 125 may also obtain any combination of patient-specific information, such as age, medical history, cancer treatment history, family history, past biopsy or cytology information, etc. The physician servers 121, hospital servers 122, clinical trial servers 123, research lab servers 124 and/or laboratory information systems 125 may transmit digitized slide images and/or patient-specific information to server systems 110 over the electronic network 120. Server system(s) 110 may include one or more storage devices 109 for storing images and data received from at least one of the physician servers 121, hospital servers 122, clinical trial servers 123, research lab servers 124, and/or laboratory information systems 125. Server systems 110 may also include processing devices for processing images and data stored in the storage devices 109. Server systems 110 may further include one or more machine learning tool(s) or capabilities. For example, the processing devices may include a machine learning tool for a disease detection platform 100, according to one embodiment. Alternatively or in addition, the present disclosure (or portions of the system and methods of the present disclosure) may be performed on a local processing device (e.g., a laptop).

The physician servers 121, hospital servers 122, clinical trial servers 123, research lab servers 124 and/or laboratory information systems 125 refer to systems used by pathologists for reviewing the images of the slides. In hospital settings, tissue type information may be stored in a laboratory information system 125.

FIG. 1B illustrates an exemplary block diagram of a disease detection platform 100 for determining specimen property or image property information pertaining to digital pathology image(s), using machine learning. The disease detection platform 100 may include a slide analysis tool 101, a data ingestion tool 102, a slide intake tool 103, a slide scanner 104, a slide manager 105, a storage 106, and a viewing application tool 108.

The slide analysis tool 101, as described below, refers to a process and system for determining data variable property or health variable property information pertaining to digital pathology image(s). Machine learning may be used to classify an image, according to an exemplary embodiment. The slide analysis tool 101 may also predict future relationships, as described in the embodiments below.

The data ingestion tool 102 may facilitate a transfer of the digital pathology images to the various tools, modules, components, and devices that are used for classifying and processing the digital pathology images, according to an exemplary embodiment.

The slide intake tool 103 may scan pathology images and convert them into a digital form, according to an exemplary embodiment. The slides may be scanned with slide scanner 104, and the slide manager 105 may process the images on the slides into digitized pathology images and store the digitized images in storage 106.

The viewing application tool 108 may provide a user with a specimen property or image property information pertaining to digital pathology image(s), according to an exemplary embodiment. The information may be provided through various output interfaces (e.g., a screen, a monitor, a storage device and/or a web browser, etc.).

The slide analysis tool 101, and one or more of its components, may transmit and/or receive digitized slide images and/or patient information to server systems 110, physician servers 121, hospital servers 122, clinical trial servers 123, research lab servers 124, and/or laboratory information systems 125 over a network 120. Further, server systems 110 may include storage devices for storing images and data received from at least one of the slide analysis tool 101, the data ingestion tool 102, the slide intake tool 103, the slide scanner 104, the slide manager 105, and viewing application tool 108. Server systems 110 may also include processing devices for processing images and data stored in the storage devices. Server systems 110 may further include one or more machine learning tool(s) or capabilities, e.g., due to the processing devices. Alternatively, or in addition, the present disclosure (or portions of the system and methods of the present disclosure) may be performed on a local processing device (e.g., a laptop).

Any of the above devices, tools, and modules may be located on a device that may be connected to an electronic network such as the Internet or a cloud service provider, through one or more computers, servers and/or handheld mobile devices.

FIG. 1C illustrates an exemplary block diagram of a slide analysis tool 101, according to an exemplary embodiment of the present disclosure. The slide analysis tool 101 may include a training image platform 131 and/or a target image platform 135.

According to one embodiment, the training image platform 131 may include a training image intake module 132, a data analysis module 133, and a slide augmentation module 134. Alternatively or in addition thereto, the slide augmentation module 134 may be included in slide intake tool 103 or as part of data ingestion tool 102.

The training data platform 131, according to one embodiment, may create or receive training images that are used to train a machine learning model to effectively analyze and classify digital pathology images. For example, the training images may be received from any one or any combination of the server systems 110, physician servers 121, hospital servers 122, clinical trial servers 123, research lab servers 124, and/or laboratory information systems 125. Images used for training may come from real sources (e.g., humans, animals, etc.) or may come from synthetic sources (e.g., graphics rendering engines, 3D models, etc.). Examples of digital pathology images may include (a) digitized slides stained with a variety of stains, such as (but not limited to) H&E, Hematoxylin alone, IHC, molecular pathology, etc.; and/or (b) digitized tissue samples from a 3D imaging device, such as microCT.

The training image intake module 132 may create or receive a dataset comprising one or more training datasets corresponding to one or more health variables and/or one or more data variables. For example, the training datasets may be received from any one or any combination of the server systems 110, physician servers 121, hospital servers 122, clinical trial servers 123, research lab servers 124, and/or laboratory information systems 125. This dataset may be kept on a digital storage device. The data analysis module 133 may identify whether an area belongs to a region of interest or salient region, or to a background of a digitized image. The slide augmentation module 134 may analyze digitized images and determine whether a region in the sample needs further analysis. The identification of such may trigger an alert to a user. The slide augmentation module 134 may also determine whether a region should have an artifact, defect, or other modification in quality. The slide augmentation module 134 may make such a determination based on a desired or predetermined image quality, received commands, an input defect, a policy, etc.

According to one embodiment, the target image platform 135 may include a target image intake module 136, a specimen detection module 137, and an output interface 138. The target image platform 135 may receive a target image and apply the machine learning model to the received target image to determine a characteristic of a target data set. For example, the target data may be received from any one or any combination of the server systems 110, physician servers 121, hospital servers 122, clinical trial servers 123, research lab servers 124, and/or laboratory information systems 125. The target image intake module 136 may receive a target dataset corresponding to a target health variable or a data variable. Specimen detection module 137 may apply the machine learning model to the target dataset to determine a characteristic of the target health variable or a data variable. For example, the specimen detection module 137 may detect a trend of the target relationship. The specimen detection module 137 may also apply the machine learning model to the target dataset to determine a quality score for the target dataset. Further, the specimen detection module 137 may apply the machine learning model to the target images to determine whether a target element is present in a determined relationship.

The output interface 138 may be used to output information about the target data and the determined relationship (e.g., to a screen, monitor, storage device, web browser, etc.). The output interface 138 may display identified salient regions of analyzed slides and/or slides with modifications or augmentations according to a desired or predetermined slide quality (e.g., synthetic slide quality).

Synthesizing Global Changes

An AI slide quality augmentation system, which may include the slide augmentation module 134, may determine global changes to properties of a slide. Such global changes may include changing a slide or sample (e.g., slice) thickness, adjusting a stain intensity (e.g., more hematoxylin and less eosin), changing a slide clarity, changing fixation quality, etc. There are multiple ways to make these global changes, including style transfer, cycle GANS, feature disentanglement, etc. An approach or method using style transfer is hereinafter described.

Figure 2:
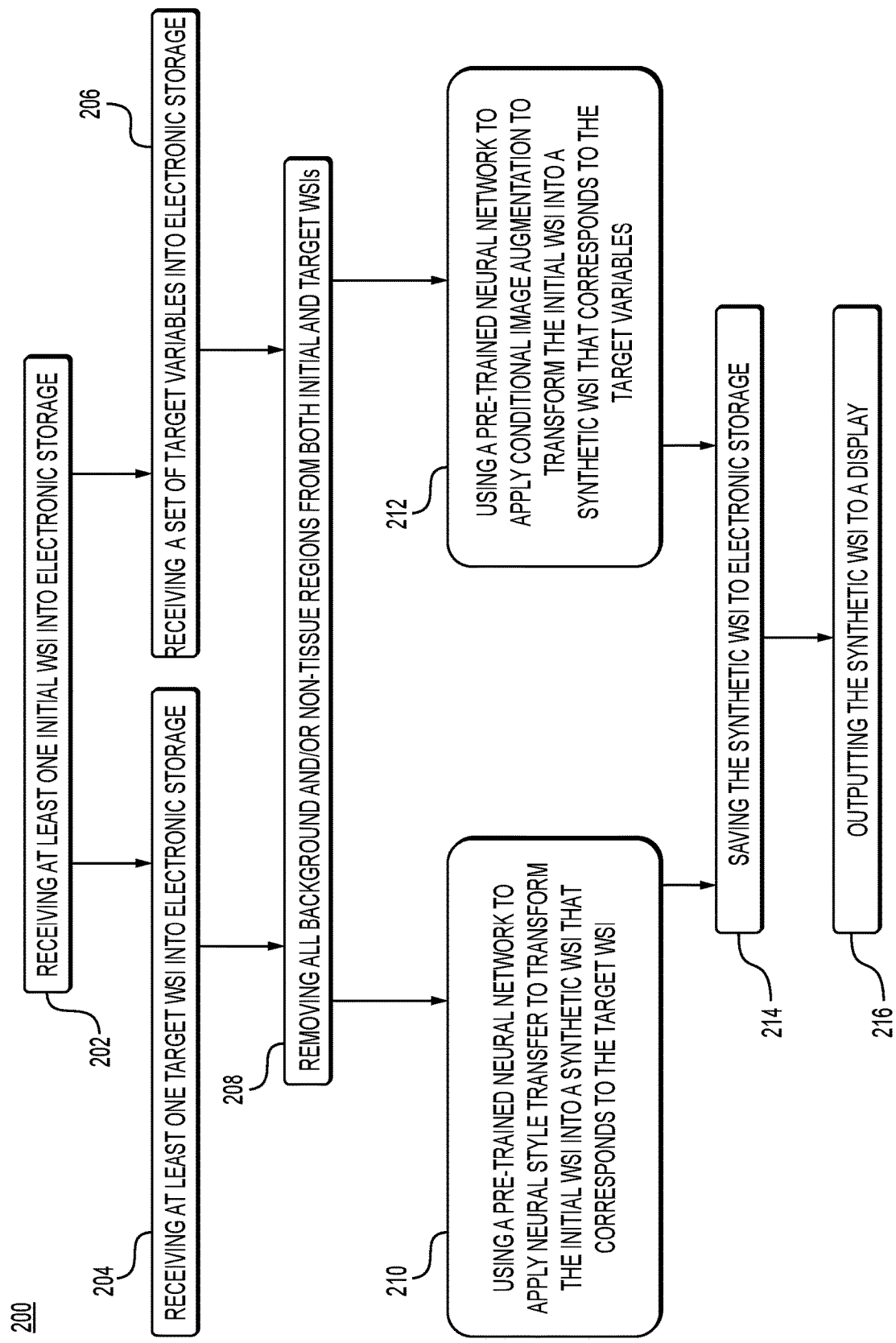
FIG. 2 is an exemplary flow chart illustrating a process for creating a synthetic whole slide image (WSI) using a target WSI and/or target variables, according to an exemplary embodiment of the present disclosure.

Referring to FIG. 2, a method 200 of using a system that synthesizes global changes may include a step 202 of receiving at least one source or initial whole slide image (WSI) into electronic storage (e.g., cloud, hard drive, RAM, etc.). The initial WSI may be marked, flagged, or intended to have its global style adjusted.

The method 200 may include a step of receiving information about slide quality aspects to modify. The slide quality aspects to modify may be configured to reduce (or alternatively, enhance) a quality of the received WSI. The step of receiving information about slide quality aspects to modify may be implemented as a step 204 of receiving at least one target WSI into electronic storage (e.g., cloud, hard drive, RAM, etc.). The target WSI may have desired or predetermined slide quality properties, defects, etc. that are to be induced in the initial WSI (e.g., being a thicker cut than a target, having a different mixture of stains, having a defect such as an artifact, hair artifact, crack, bubbles, etc.). Alternatively or in addition thereto, the method 200 may include a step 206 of receiving one or more (e.g., a set of) target variables in electronic storage. The one or more target variables may indicate, correspond to, or describe one or more desired or predetermined slide quality properties such as defects or enhancements (e.g., being a thicker/thinner cut slide, containing or not containing hair artifacts, containing or not containing bubbles, etc.)

The method 200 may include a step 208 of removing all background and/or non-tissue regions from both initial and target WSIs. This removal may be done by breaking or partitioning each image into tiles and identifying whether the tiles have tissue using Otsu's method, color variance analysis, etc.

The method may include a step of generating a synthetic whole slide image by applying a machine learning model or neural network to modify the received WSI according to the received information about slide quality aspects (e.g., in steps 204 and 206). If the method 200 includes step 204 of receiving a target WSI (instead of or in addition to, for example, the set of target variables), the method 200 may include a step 210 of using a trained machine learning model or AI module (e.g., a pre-trained neural network) to apply neural style transfer to transform the initial WSI into a synthetic WSI that corresponds to, reflects, or matches the target WSI (e.g., the synthetic WSI includes a predetermined defect in the target WSI). If the method 200 includes step 206 of receiving a set of target variables, the method may include a step 212 of using trained machine learning model or AI module (e.g., a pre-trained neural network) to apply conditional image augmentation to transform the initial WSI into a WSI that corresponds to, reflects, or matches the properties of (or indicated by) the target variables such as a predetermined defect, etc. (which may be referred to as a synthetic WSI). In some implementations, the method 200 may include steps 202, 204, 208, and 210. In other implementations, the method 200 may include steps 202, 206, 208, and 212. In yet other implementations, the method 200 may include all of steps 202 through 212.

The method 200 may further include a step 214 of saving the new synthetic WSI to electronic storage. The method 200 may also include a step 216 of outputting the synthetic WSI to a display.

Synthesizing Local Artifacts

An AI slide quality augmentation system, which may include the slide augmentation module 134, may determine local artifacts for a slide or WSI. Synthetic slides that have local artifacts within them may be generated by compositing information from slides with these artifacts into slides that lack them. For example, a slide with bubbles may have the bubbles segmented out, and then these segmented bubbles may be added to a slide that does not have bubbles. A same approach may be handled for hair, folds, scratches, ink, etc. This same approach may also be handled on a same slide to incorporate artifacts into regions (e.g., segmented bubbles may from one region of a slide may be added to another region that does not have bubbles).

Local artifacts may be taken from slides that have these artifacts, and then, the local artifacts may be composited with a slide without these artifacts using image matting. Image matting is a process of taking image content from one image and pasting it into another image. Techniques disclosed herein may introduce a local artifact into a single WSI, but some embodiments may be run on many WSIs to create a large synthetic dataset that has many artifacts.

Figure 3:
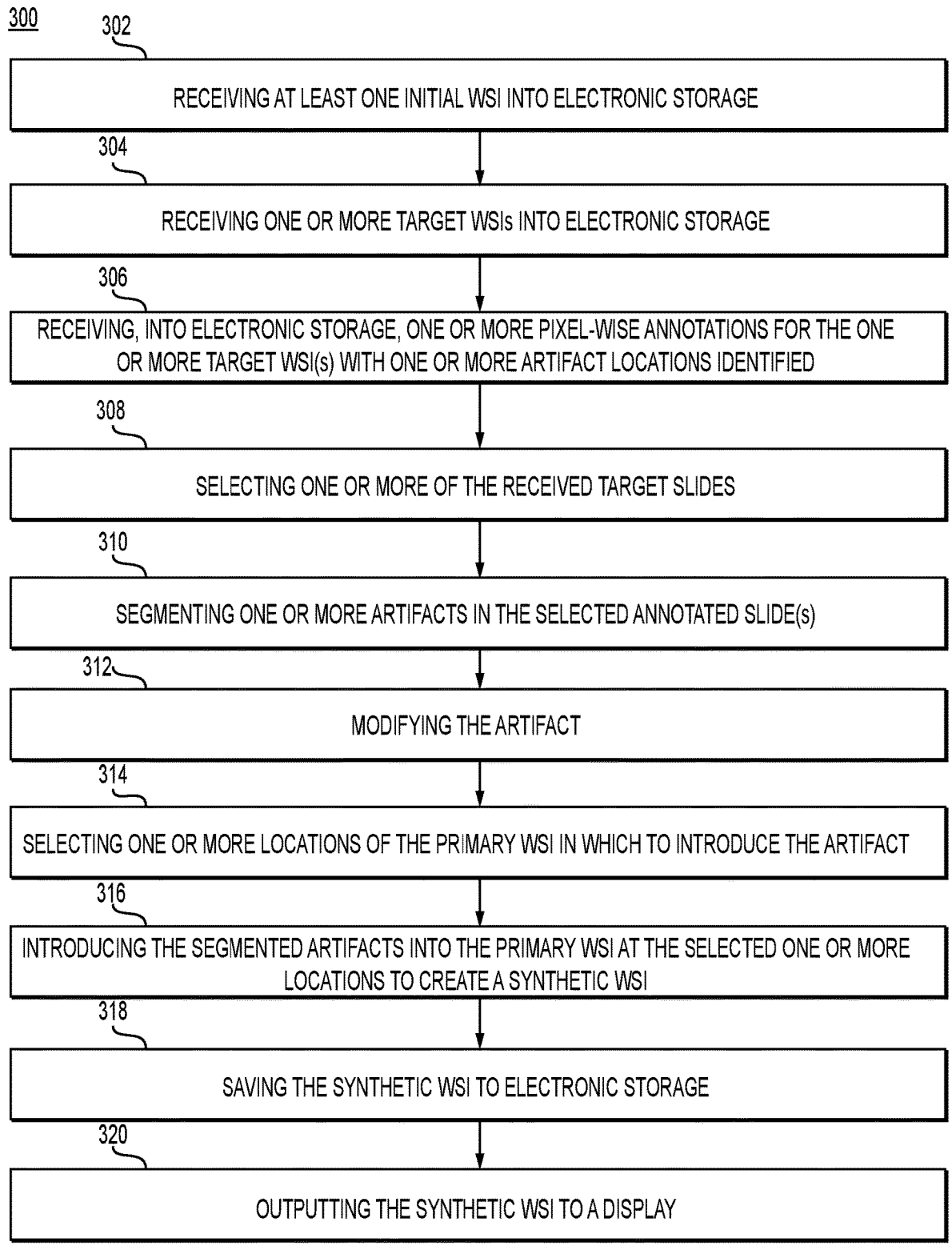
FIG. 3 is an exemplary flow chart illustrating a process for creating a synthetic whole slide image (WSI) using annotations, according to an exemplary embodiment of the present disclosure.

Referring to FIG. 3, a method 300 of using a system that synthesizes local artifacts may include a step 302 of receiving, into electronic storage (cloud, hard drive, RAM, etc.), at least one primary or initial WSI. The initial WSI may be intended to receive or be induced with introduced local artifacts to be augmented. The method 300 may include a step 304 of receiving one or more (e.g., a set of) target WSIs into electronic storage. The one or more target WSIs may have one or more artifacts of interest (or target artifacts) annotated within them. These WSIs may be slides that have hair, bubbles, ink, etc. The method 300 may include a step 306 of receiving, into electronic storage, one or more pixel-wise annotations for the one or more target WSI(s) with one or more artifact locations identified.

The method 300 may include a step 308 of selecting one or more of the received annotated or target slide(s) to be used. This selection could be done randomly or could be done based on a predetermined policy, process, or algorithm, e.g., a slide that has been the least used to generate other slides could be selected.

The method 300 may include a step 310 of taking or segmenting one or more artifacts in the selected annotated slide(s). Step 310 may include identifying or determining artifacts in the selected annotated slides (e.g., according to the annotations).

The method 300 may include a step 312 of modifying the artifact, such as rotating the artifact, adjusting its color, and/or brightness properties and/or its size. Step 312 may include a random modification and/or a modification according to a predetermined policy, process, or algorithm.

The method 300 may include a step 314 of selecting one or more locations of the primary WSI in which to introduce the artifact. The one or more locations may be randomly chosen or chosen using a predetermined policy, process, or algorithm, e.g., choosing a random location in a background non-tissue location.

The method may include a step 316 of introducing, superimposing, or combining the one or more segmented artifacts into the primary WSI at the selected one or more locations. Step 316 may include matting or image matting the artifact into the primary. This matting may be done in multiple ways, such as naïve "pasting" of the artifact into the primary WSI (though this can lead to edge artifacts) or such as using deep learning based matting methods (e.g., High-Resolution Deep Image Matting (HDMatt)) or high-resolution deep learning matting methods. In steps 310 through 316, each annotated slide may be segmented to remove the artifact(s), and the artifact(s) may be superimposed on the primary WSI.

After matting, each of the one or more primary WSIs may be a new synthetic WSI. The method 300 may further include a step 318 of saving the new one or more synthetic WSIs to electronic storage. The method 300 may also include a step 320 of outputting the one or more synthetic WSIs. Although steps 308 through 316 may be performed using an AI system or machine learning model, alternatively, tissue may be manually, physically prepared and stained in different ways to represent potential preanalytic variation to create synthetic WSIs.

Augmentation for Creating More Robust AI Systems

Figure 4A:
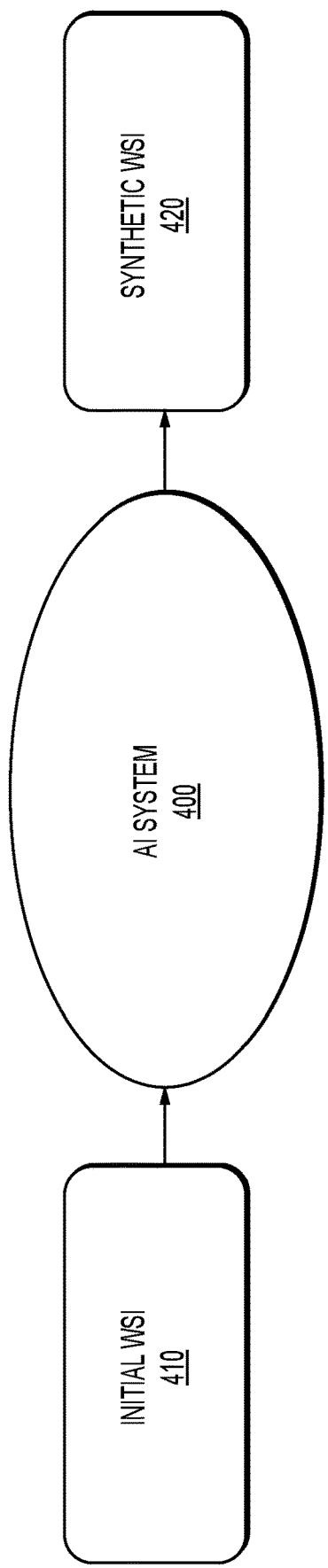
FIG. 4A illustrates an exemplary block diagram of an artificial intelligence (AI) system configured to create a synthetic WSI, according to an exemplary embodiment of the present disclosure.

Referring to FIG. 4A, AI systems trained with limited amounts of data or data that lacks variability can lead to an AI system that does not generalize well. For example, if an AI system is trained on data from a lab with a particular slide preparation and scanning procedure but is tested on a digital WSI from another lab with a slight difference in preparation and scanning procedure, the AI system might not perform well, as the AI system may not have encountered such a WSI during training. To overcome this problem, techniques disclosed herein may be used to synthetically increase an amount and variability of a set of WSIs that are used for training an AI system so that the system can learn to become robust to such variations in preanalytical factors. This augmentation of slides may simulate training on a larger more diverse dataset.

Augmentation or modification may be performed on a whole slide image or in a subregion of a whole slide image. For example, referring to FIG. 4A, an AI system 400 may be trained to receive, as input, an initial WSI 410. The initial WSI 410 may include a slide image having certain cellular structures. The AI system 400 may determine one or more augmentations or modifications (e.g., artifacts to introduce) to output a synthetic WSI 420. The synthetic WSI 420 may include a slide image having the same certain cellular structures, including in the same orientation, as the initial WSI 410. However, the synthetic WSI 420 may include different preanalytic features from the initial WSI 410.

Figure 4B:
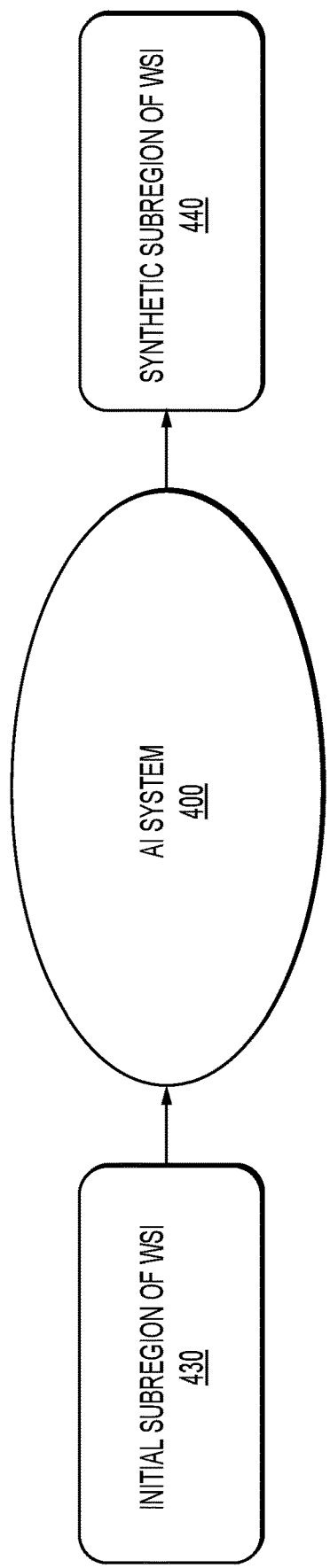
FIG. 4B illustrates an exemplary block diagram of an AI system configured to create a synthetic subregion of a WSI, according to an exemplary embodiment of the present disclosure.

Similarly, referring to FIG. 4B, the AI system 400 may be trained to receive, as input, an image of an initial subregion 430 of a WSI. The AI system 400 may receive the entire WSI having the initial subregion 430 or may receive a partitioned image of the initial subregion 430. The initial subregion 430 may include certain cellular structures. The AI system 400 may determine one or more augmentations or modifications (e.g., artifacts to introduce) to output a synthetic or modified subregion 440. The AI system 400 may output an entire WSI including the synthetic or modified subregion 440 or may output a partitioned image of the synthetic subregion 440. The synthetic subregion 440 may include the same certain cellular structures, including in the same orientation, as the initial subregion 430. However, the synthetic subregion 440 may include different preanalytic features from the initial subregion 430.

Referring to FIG. 5, a method of creating one more synthetic slides 500 may include a step 502 of receiving one or more (e.g., a set of) initial WSIs that can be used to train an AI system into electronic storage (e.g. RAM, hard drive, cloud storage, etc.) The method 500 may include a step 504 of receiving information about slide quality aspects to modify or manipulate. For example, the information may include a list of artifacts (e.g., cracks, bubbles, blurry portions, or other defects) and/or slide quality aspects (e.g., clarity) to manipulate, and/or a range of these manipulations to be applied.

The method 500 may include a step 506 of running or applying an AI or machine learning system or model on the at least one received initial WSI to introduce the modifications according to the received information (e.g., list of artifacts and other quality issues at ranges indicated) into each of the at least one initial WSI to create at least one new, modified, or synthetic WSIs. The step 506 of running the machine learning system may be repeated any number of times to create any number of additional synthetic WSIs. Step 506 may apply the machine learning system on the fly, without explicitly saving the synthetic WSIs. As an alternative, tissue may be manually, physically prepared and stained in different ways to represent potential preanalytic variation.

Alternatively, the method 500 may include a step of saving the synthetic WSIs to electronic storage and/or outputting the synthetic WSIs to a display. The method 500 may include a step 508 of training an AI or machine learning system (e.g., a diagnostic system) on a plurality of (e.g., a large set of) modified WSIs produced during step 506 of running the system, repeatedly running the system, and/or applying the system on the fly.

Pathologist Education

Training junior pathologists to assess histopathological features on a slide depending on varying levels of slide quality and artifacts may be difficult, especially if these quality problems are rare. Techniques disclosed herein may be used to train pathologists and create visual examples of when certain diagnoses may or may not be interpreted amidst certain quality issues. To address this problem, techniques disclosed herein may create a large number of synthetic or modified slides, with any type of diagnostic features(s) on the slide, with each of the artifacts in isolation from a set of slides that do not have these artifacts or issues. Aspects disclosed herein may continuously or progressively create synthetic or modified slides used to train a machine learning system, and aspects disclosed herein may continue to create new synthetic or modified slides until learning has ceased. Aspects disclosed herein may create a new synthetic or modified slide each time a modified slide is requested for review. Alternatively, in some examples, aspects disclosed herein may create a predetermined number of synthetic or modified slides and re-review the created slides. A severity of the artifacts may be controlled such that these measurements may be done in a nuanced manner, e.g., to ascertain a range of acceptable quality issues in which a slide and/or image may be safely used to identify various diagnostic findings such as the presence of cancer. Techniques disclosed herein may also create combinations of these artifacts so that they co-occur on a same slide. Once these combinations have been created, a quality of each synthetic slide and its quality problems may be known, and then these quality problems may be used to educate pathologists on a level of acceptable quality for reviewing slides unassisted (without AI) and assisted (with AI).

Figure 6:
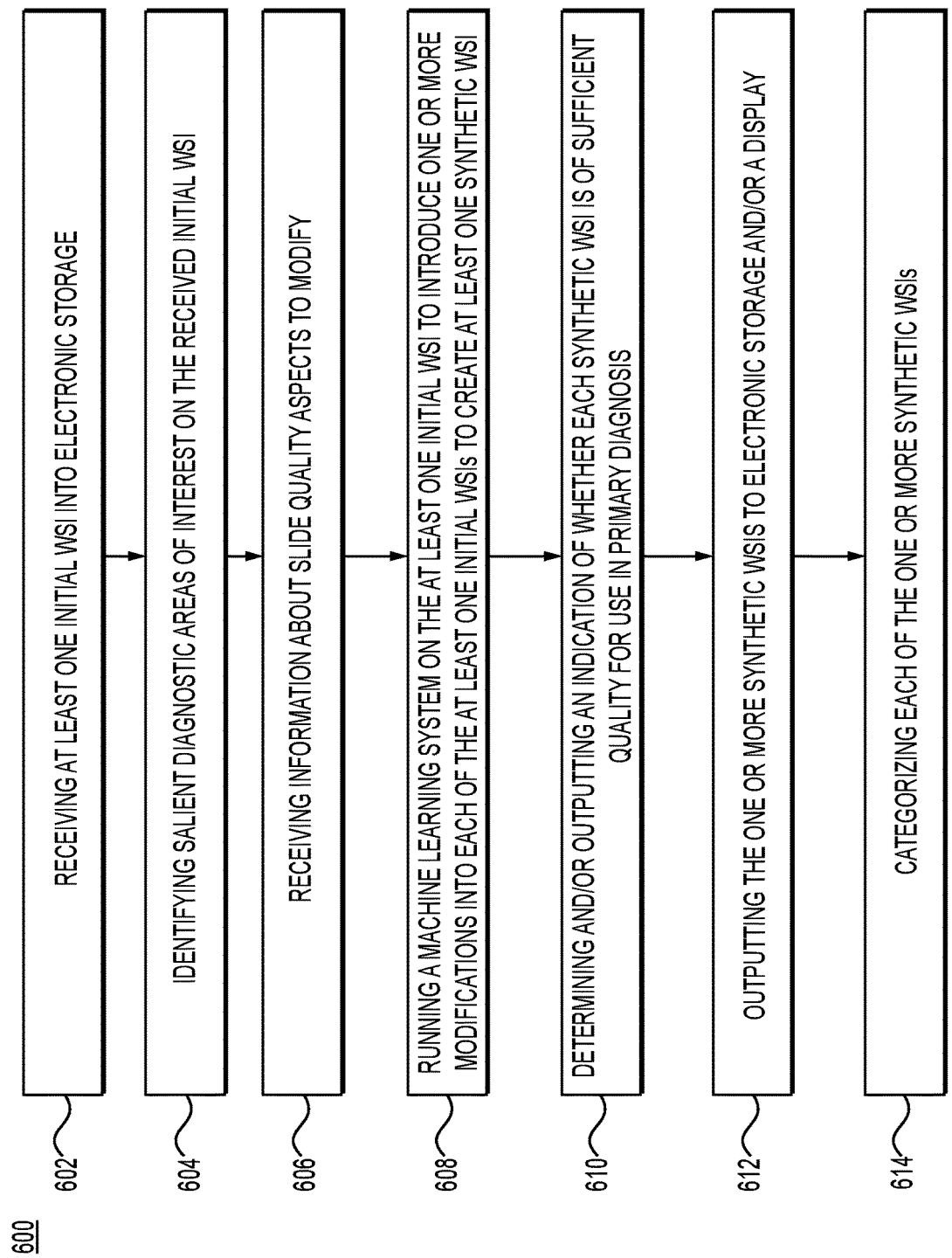
FIG. 6 is an exemplary flow chart illustrating a process for creating at least one synthetic whole slide image (WSI) and determining whether the WSI is of sufficient quality, according to an exemplary embodiment of the present disclosure.

Referring to FIG. 6, a method of creating one or more synthetic slides 600 may include a step 602 of receiving one or more (e.g., a set of) initial WSIs that can be used to train pathologists into electronic storage (e.g., RAM, hard drive, cloud storage, etc.). The method may include a step 604 of identifying one or more salient diagnostic areas of interest on the received initial WSI. Step 604 may include applying an AI or machine learning system (e.g., a disease detection platform or a salient region detection system) that can detect, determine, or identify salient diagnostic areas of interest on the received initial WSI. Details on determining salient regions are found in U.S. application Ser. No. 17/016,048, filed Sep. 9, 2020, and Ser. No. 17/313,617, filed May 6, 2021, the entire contents of which are incorporated herein by reference.

The method 600 may include a step 606 of receiving information about slide quality aspects to modify. This information may include a list of artifacts, slide quality aspects to manipulate, and/or a range of these manipulations to be applied.

The method 600 may include a step 608 of running a machine learning or AI system or model (e.g., a trained AI slide quality augmentation system or slide augmentation module 134 in FIG. 1C) on the one or more received WSIs to introduce modifications into each of the at least one initial WSIs to create at least one synthetic or modified WSI according to the information received in step 606 (e.g., the list of artifacts and other quality issues into each WSI at the ranges that are specified). Step 608 may include running a trained AI slide quality augmentation system on a received set of WSIs to create a new set of synthetic WSIs. As an alternative, tissue may be manually, physically prepared and stained in different ways to represent potential preanalytic variation to create the synthetic WSIs.

The method 600 may include a step 610 of determining and/or outputting (e.g., to electronic storage or a display) an indication of whether each of the one or more received synthetic WSIs is of sufficient or predetermined quality for use in primary diagnosis. For example, step 610 may include identifying one or more salient diagnostic areas of interest on the generated synthetic WSIs (e.g., by applying an AI or machine learning system) and comparing the identified salient diagnostic areas of interest to those identified in the initial whole slide image. The primary diagnosis may be related or correspond to the identified one or more salient diagnostic areas of interest. If the number of identified salient diagnostic areas of interest on a given synthetic WSI is within a predetermine range or tolerance level (e.g., as determined by a user), then that synthetic WSI may be accepted (or alternatively, rejected). The accepted synthetic WSIs may be stored and/or used for training, while the rejected WSIs may not be used for training.

The method 600 may include a step 612 of outputting the one or more synthetic WSIs to electronic storage and/or a display. Step 612 may also include determining and/or outputting corresponding performance characteristics and outputs to electronic storage and/or a display. The method 600 may include a step 614 of categorizing or labelling each of the one or more synthetic WSIs, such as by tissue type, stain type, diagnosis, assessed quality, a type of defect or artifact introduced, or other categories (e.g., to a web portal or other storage) and outputting the categorization so that a pathologist with access to a web portal with the synthetic WSIs may review these synthetic WSIs and corresponding categories for training purposes.

Histotechnician Training

Training histotechnicians to prepare for and analyze quality of slides they prepare may be difficult. Techniques disclosed herein may be used to train histotechnicians and create visual examples of quality issues that may result from any combinations of variables, including time to retrieve a specimen and start preparation, size of original specimen, stain reagent, technology available to embed into paraffin wax, other hardware including a tissue slicer, etc. To train histotechnicians, techniques disclosed herein may create a plurality of (e.g., a large number of) synthetic slides, with any type of diagnostic features(s) on the slide, with each artifact and root cause for each artifact in isolation from a set of slides that do not have these artifacts and/or causes.

A severity of the artifacts may be controlled such that these measurements can be done in a nuanced manner, e.g., to ascertain a range of acceptable quality issues in which a slide and/or image may be safely used to identify various diagnostic findings such as the presence of cancer. Techniques disclosed herein may also be used to create combinations of these artifacts so that they co-occur on the same slide.

A specific histotechnician may enter general protocols and specifications of a lab setup so that a system may generate synthetic WSIs that emulate what the histotechnician will likely encounter in practice. Once these synthetic WSIs have been generated, a quality of each synthetic slide and its quality problems may be known, and these qualities and problems may be used to educate histotechnicians on a level of acceptable or desirable quality and how certain mistakes or environmental considerations may impact a preanalytical quality of the slide.

Figure 7:
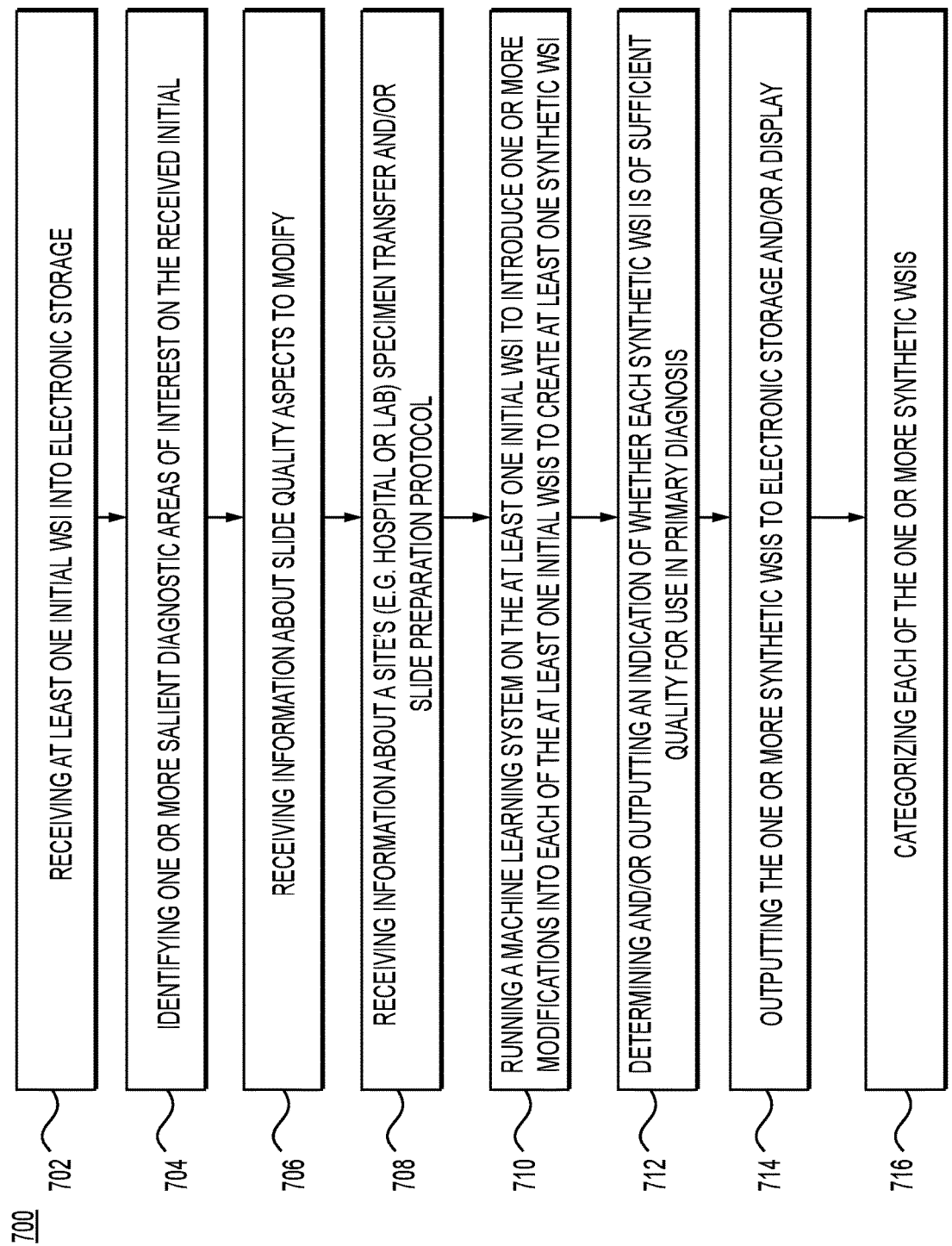
FIG. 7 is an exemplary flow chart illustrating a process for creating at least one synthetic whole slide image (WSI) based on a site's specimen transfer and/or slide preparation protocol and determining whether the WSI is of sufficient quality, according to an exemplary embodiment of the present disclosure.

Referring to FIG. 7, a method of creating one or more synthetic slides 700 may include a step 702 of receiving at least one (e.g., a set of) initial WSIs that may be used to train histotechnicians into electronic storage (e.g., RAM, hard drive, cloud storage, etc.) The method 700 may include a step 704 of identifying one or more salient diagnostic areas of interest on the received initial WSI. Step 704 may include applying a machine learning or AI system or model trained to identify salient diagnostic areas of interest on WSIs. The method 700 may include a step 706 of receiving information about slide quality aspects to modify, such as a list of artifacts and/or slide quality aspects to manipulate, and/or a range of these manipulations to be applied.

The method 700 may include a step 708 of receiving information about a site's (e.g. hospital or lab) specimen transfer and/or slide preparation protocol (e.g., cutting or staining procedures). For example, step 702 may include receiving information about reagents used and/or common errors associated with the reagents, a scanner type and/or errors associated with the scanner type or whether the scanner type is prone to certain errors, a technician who prepared the tissue or slides and/or an associated pattern, process, or way of preparation associated with the technician, a glass slide material and/or associated errors or common defects associated with the glass slide material, a manufacturer or company that produced the glass slide and/or errors or methods associated with the manufacturer or company, a coverslip type and/or associated errors or common defects associated with the coverslip type, and/or a manufacturer or company that produced the cover slip and/or errors or methods associated with the manufacturer or company. Step 708 may include receiving additional metadata (tissue type, stain type, etc.). Such information may be used to create synthetic slides that represent the most likely scenarios that a technician at the site will see in their workflow.

The method 700 may include a step 710 of running an AI or machine learning system (e.g., the AI system) on the one or more received initial WSIs to create at least one synthetic or modified WSI. Step 710 may include taking as input the information received in steps 706 and 708 and introducing one or more modifications into each of the at least one initial WSIs according to the received information (e.g., list of artifacts and other quality issues at ranges specified) to create the at least one synthetic WSI. Step 710 may include running a trained AI slide quality augmentation system or slide augmentation module 134 (FIG. 1C) on a received set of initial WSIs to create a new set of synthetic WSIs. Alternatively, tissue may be manually, physically prepared and stained in different ways to represent potential preanalytic variation to create synthetic WSIs.

The method 700 may include a step 712 of determining and/or outputting (e.g., to electronic storage or a display) an indication of whether each of the one or more synthetic WSIs is of sufficient quality for use in primary diagnosis.

The method may include a step 714 of outputting the synthetic WSIs, corresponding performance characteristics, and other outputs to electronic storage or a display. The method 700 may include a step 716 of categorizing each of the one or more synthetic WSIs, such as by tissue type or stain type or diagnosis or other categories, (e.g., to storage or a web portal) and outputting the categorization so that a pathologist with access to a web portal with the images may review for training purposes.

Catching Preanalytic Deficits

Large turnaround time pressures, in addition to high quality bars, may occur in a histopathology lab. In addition, many unique variables may impact a technician's ability to consistently prepare high quality slides. Techniques disclosed herein may be used to address these problems and constantly monitor a quality of preanalytical preparation of tissue as soon as a digital image and/or whole slide image of a slide is created. Techniques disclosed herein may be integrated within a digital workflow so that an analysis is fast and automated and such that appropriate personnel may be notified to address a deficit in a timely manner so as not to delay diagnosis of a patient.

Techniques disclosed herein may use a large set of WSIs from a range of sources. Techniques disclosed herein may include running a trained AI slide quality augmentation system to create a new set of synthetic WSIs that represent a range of possible poorly prepared slides.

Figure 8:
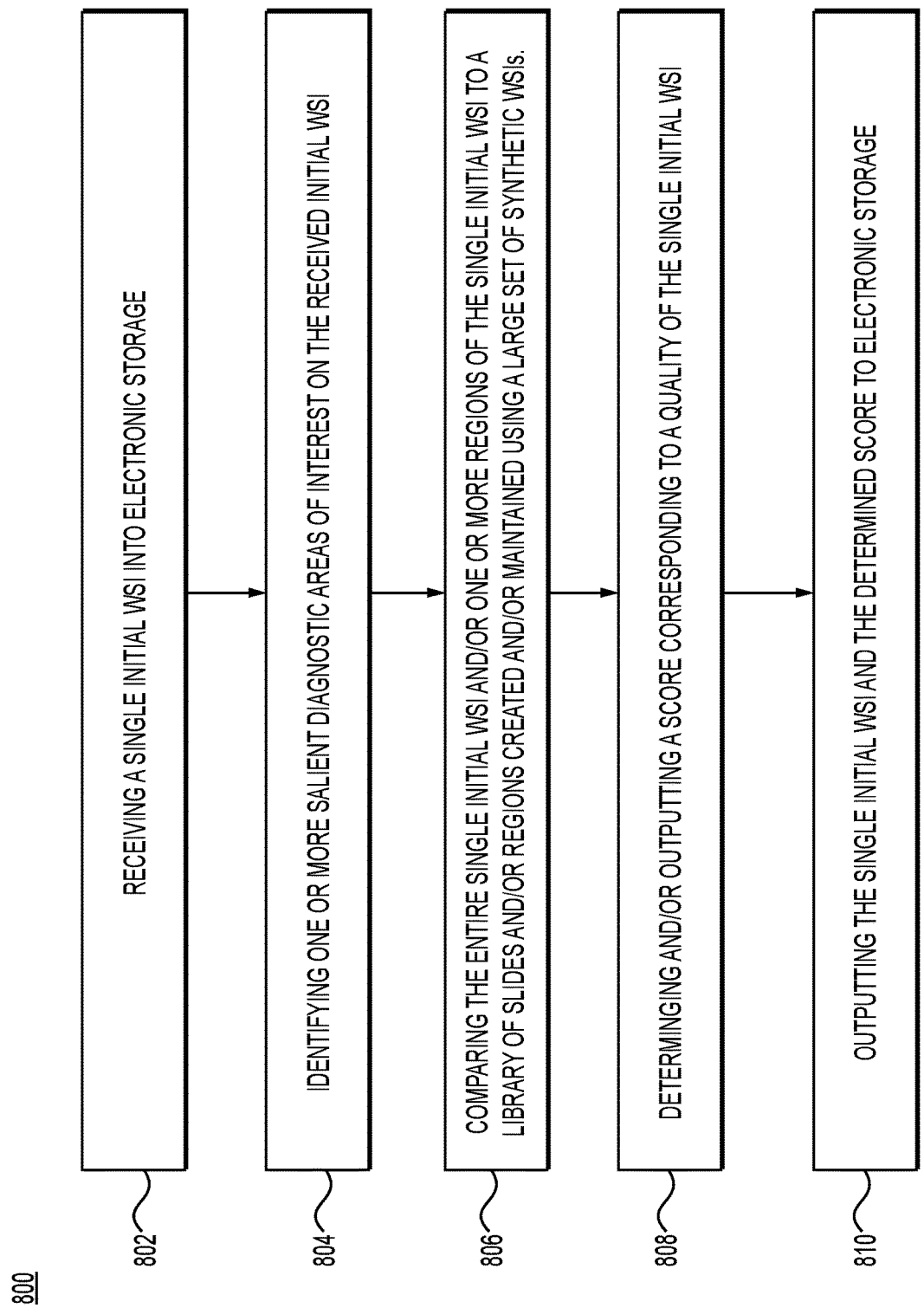
FIG. 8 is an exemplary flow chart illustrating a process for determining a slide quality, according to an exemplary embodiment of the present disclosure.

Referring to FIG. 8, a method of determining a quality of one or more WSIs using the trained AI slide quality augmentation system may include a step 802 of receiving a single initial WSI into electronic storage (e.g., RAM, hard drive, cloud storage, etc.) The single initial WSI may have been digitized by a digital pathology scanner.

The method 800 may include a step 804 of identifying one or more salient diagnostic areas of interest on the received initial WSI. Step 804 may include applying an AI or machine learning system or model that may identify salient diagnostic areas of interest on the single WSI.

The method 800 may include a step 806 of comparing the entire single initial WSI and/or one or more regions (e.g., the one or more identified salient regions) of the single initial WSI to a library of slides and/or regions created and/or maintained using a large set of synthetic WSIs.

The method 800 may include a step 808 of determining and/or outputting a score corresponding to a quality of the single WSI. For example, step 808 may include outputting a classification output that may categorize or qualitatively evaluate a quality of the single WSI (e.g., poor, good, borderline), and/or outputting a score proportional to a determined quality of the single WSI. Based on the output, step 808 may include outputting a notification. For example, if the determined classification is "poor" or the determined score is equal to or lower than a quality threshold, step 808 may include notifying personnel via email or a web portal or mobile app that the specific slide corresponding to the single initial WSI must be re-prepared.

The method 800 may include a step 810 of adding the single initial WSI and its determined score and/or quality to electronic storage or a general library so that these WSIs may be used to further train the AI slide quality augmentation system or become a source of 'real-life' examples for future use (e.g., for training or education). Step 810 may apply to any single initial WSI, or may alternatively be applied to single initial WSIs having a determined classification as "poor" or determined score equal to or lower than a quality threshold.

Assessing Generalization to Another Site

When using AI systems on new data, such as from a new site or new sample from an existing site, it is beneficial to know if a sample is out of a distribution of expected data, or if an output of the AI system on the new sample is reliable. Techniques disclosed herein may be used to measure a quality of an unseen WSI by assessing a required amount of each transformation or artifact removal, or combination thereof, until the slide is deemed artifact free or close to an expected distribution of the data that is known to produce reliable results when passed to the AI system.

Figure 9:
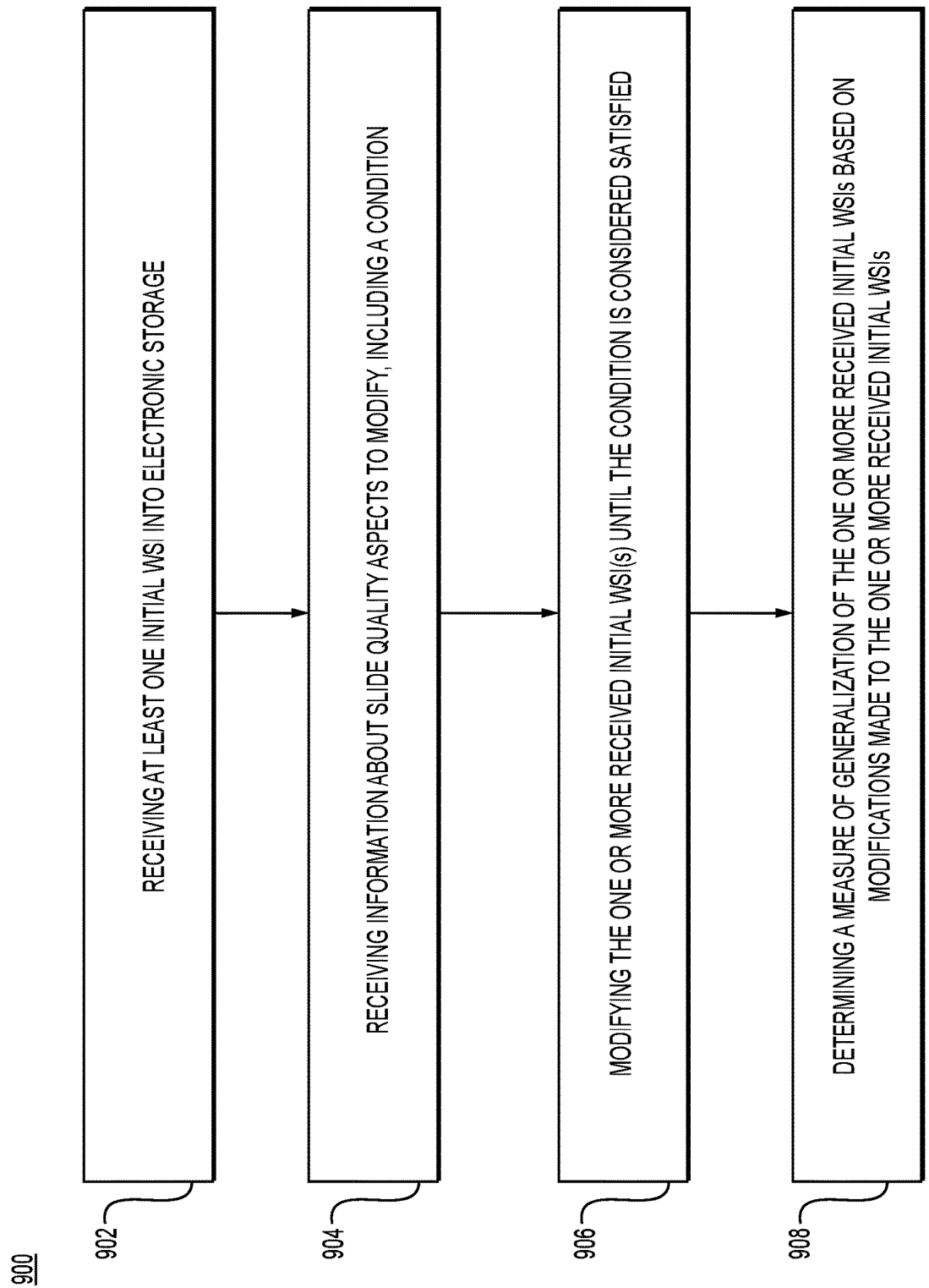
FIG. 9 is an exemplary flow chart illustrating a process for determining a measure of generalization, according to an exemplary embodiment of the present disclosure.

Referring to FIG. 9, a method 900 of determining a generalization of one or more WSIs may include a step 902 of receiving one or more initial WSIs into electronic storage. The one or more initial WSIs may be desired or intended to be measured for fitness or quality with an AI system.

The method 900 may include a step 904 of receiving information about slide quality aspects to modify, including an indicator or condition. The information may include a list of artifacts and slide quality aspects to manipulate and/or a range of these manipulations to be applied. The indicator may include a canonical slide or set of canonical slides, a metric or a set of metrics, or an indicator of a canonical or a distribution measure (such as a human annotator or annotation).

The method 900 may include a step 906 of modifying or manipulating the one or more received initial WSI(s) until the indicator or condition is considered satisfied (i.e., until the modified initial WSI reflects the indicator). For example, step 906 may include using any or all possible combinations of listed artifacts until the indicator is considered satisfied. Step 906 may be performed using an AI or machine learning system, or alternatively by manually, physically preparing and staining tissue in different ways to represent potential preanalytic variation and/or artifacts until the indicator is considered satisfied.

The method 900 may include a step 908 determining a measure of generalization or a quality or defect deviation of the one or more received initial WSIs based on an extent (e.g., number and/or severity) of modifications to the received initial WSIs. Step 908 may include using received ranges as a measure of generalization to another site, lab or hospital, where larger manipulations required to satisfy the indicator may indicate worse generalization. A worse generalization may indicate that the initial WSI has a rare or unexpected defect or quality, that a sample on the WSI is out of a distribution of expected data, or that the initial WSI is not reliable.

Assessing a Robustness of an AI System to Various Quality Problems

Assessing a quality, efficacy, or performance of an AI system on images with quality problems may be difficult if these quality problems are rare. Issues such as tissue thickness and over and/or under-staining may have a dramatic negative impact on the efficacy of an AI system. Techniques disclosed herein may be used to address these problems. Techniques disclosed herein may create a large number of synthetic slides with each type of artifact in isolation from a set of slides that do not have these issues or artifacts.

A severity of the artifacts may be controlled such that these measurements can be done in a nuanced manner, e.g., to ascertain a range of acceptable slide thickness values in which an AI system may be safely used to identify various diagnostic findings such as the presence of cancer. Techniques disclosed herein may also be used to create combinations of these artifacts so that they co-occur on the same slide. Once these combinations and/or measurements are done, a quality of each synthetic slide and its quality problems may be known, and these quality measurements and quality problems may be used to infer or determine a performance of an AI system.

Figure 10:
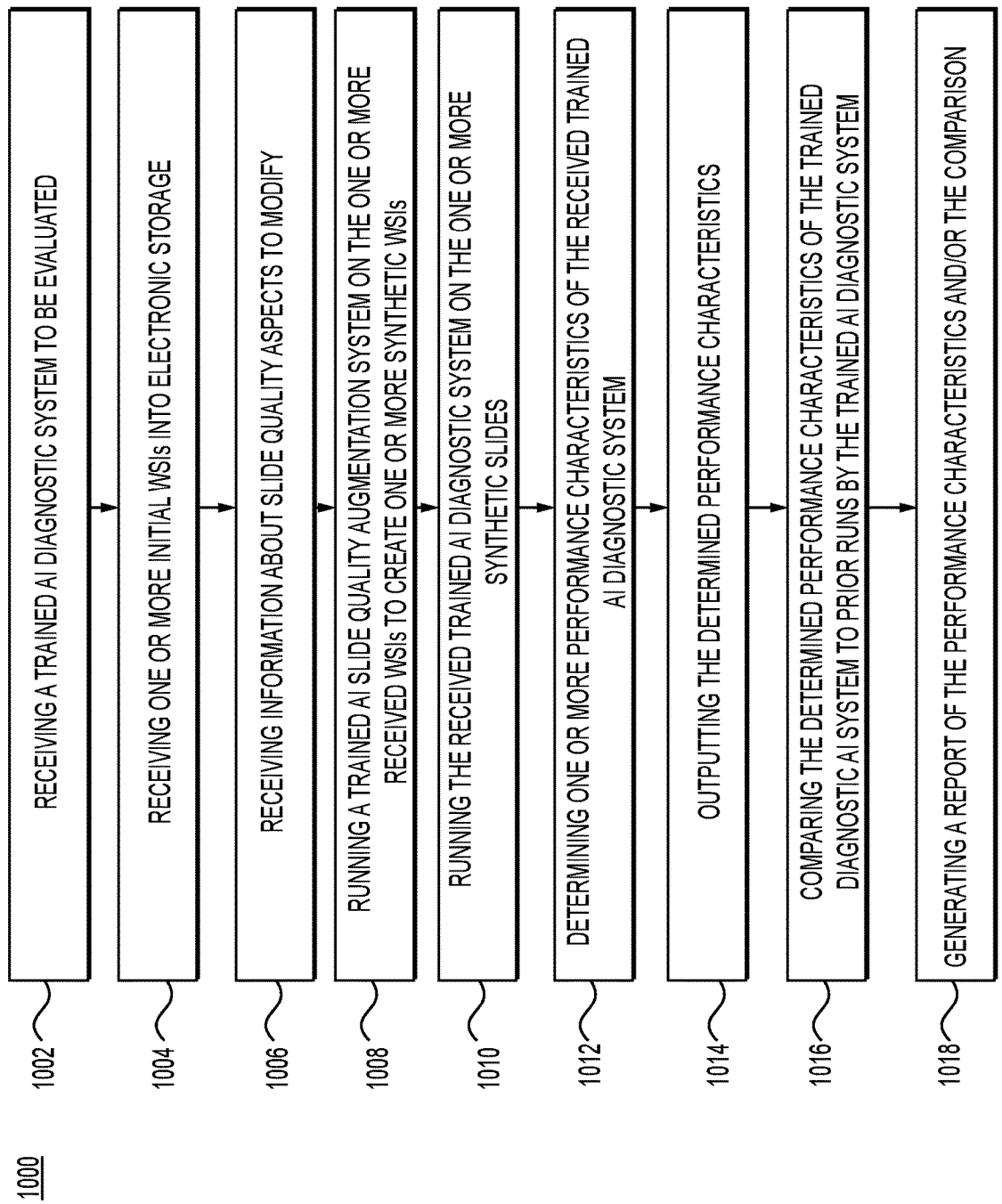
FIG. 10 is an exemplary flow chart illustrating a process for evaluating a performance of an AI diagnostic system, according to an exemplary embodiment of the present disclosure.

Referring to FIG. 10, a method of determining performance or robustness of an AI system may include a step 1002 of receiving a trained AI diagnostic system to be evaluated. The trained AI diagnostic system may be selected to be evaluated for performance characteristics when quality problems are present.

The method 1000 may include a step 1004 of receiving one or more (e.g., a set of) initial into electronic storage (e.g., RAM, hard drive, cloud storage, etc.). The one or more initial WSIs may be configured for evaluating an AI system and may have a determined ground truth diagnosis.

The method 1000 may include a step 1006 of receiving information about slide quality aspects to modify, such as a list of artifacts, slide quality aspects to manipulate, and/or a range of these manipulations to be applied.

The method 1000 may include a step 1008 running a trained AI slide quality augmentation system on the one or more received WSIs to modify the one or more received initial WSIs according to the received information, such as by introducing the list of artifacts and other quality issues into each WSI at the ranges that are specified, to create one or more synthetic WSIs. Alternatively, tissue may be manually, physically prepared and stained in different ways to represent potential preanalytic variation to create synthetic WSIs.

The method 1000 may include a step 1010 of running the received trained AI diagnostic system on the one or more synthetic slides. Step 1010 may include running the received trained AI diagnostic system to predict or determine a diagnosis based on the synthetic slides, identify salient diagnostic areas of interest on the synthetic slides, etc. Step 1010 may include outputting, via the trained AI diagnostic system, an output related to the determination by the trained AI diagnostic system.

The method 1000 may include a step 1012 of determining one or more performance characteristics or scores based on the determined diagnoses, the received information (e.g., artifacts listed), and/or based on other input (e.g., conditions specified). The performance characteristics may be determined based on received ground truth diagnostic determinations, based on a comparison to previous determinations and/or characteristics of the trained AI diagnostic system, and/or based on a comparison to determinations made by a different AI diagnostic system on the same synthetic slides.

In evaluating a robustness or performance in step 1012, the performance of the trained AI diagnostic system may be evaluated as a function of the artifacts (e.g., as a function of a number or severity of the artifacts, such as a level of blur). The determined one or more performance characteristics or scores may be task specific. For example, the method 1000 may be used to determine the accuracy, performance, or robustness of an AI diagnostic system (e.g., cancer detection system) when analyzing slide images with certain defects (e.g., certain degrees of blur or certain artifacts). In this example, step 1012 may include determining a performance by the AI diagnostic system when these certain defects are present and determining a performance by the AI diagnostic system when they are not present, and determining a difference in the performance when the defects are present and when the defects are not present. The difference may be indicative to a tolerance of the AI diagnostic system to these defects. If this performance difference is statistically significant (e.g., greater than a threshold), then the AI diagnostic system may not be as tolerant.

The method 1000 may include a step 1014 of outputting the determined performance characteristics to electronic storage and/or a display. The method 1000 may include a step 1016 of comparing the determined performance characteristics of the trained diagnostic AI system to prior runs by the trained AI diagnostic system to assess if the AI system has significantly changed in performance compared to prior versions. The method 1000 may include a step 1018 of generating a report of the performance characteristics and/or the comparison. Step 1018 may include outputting the report to electronic storage and/or a display. Step 1018 may also include determining whether the performance characteristics are indicative of a low or unacceptable performance (and/or determining whether the performance characteristics are at or below predetermined performance thresholds) and outputting a notification if unacceptable or low performance is determined.

Assessing a Quality of Upstream Workflows from a Site

Transitioning from a manual to a fully digital workflow in pathology may take years. This long transition may be due to technology assessment and selection, budget approvals, technology integration considerations, pathologist onboarding, and buy-in, etc. Once standards are established for enabling streamlined digital and AI-enabled workflows for primary diagnosis, certifying a site's readiness for AI-enabled workflows may be important for various stakeholders, including their customers and patients. There is no real guideline or standard for this type of assessment/validation/certification. Techniques disclosed herein may automate and/or standardize this type of assessment.

Figure 11:
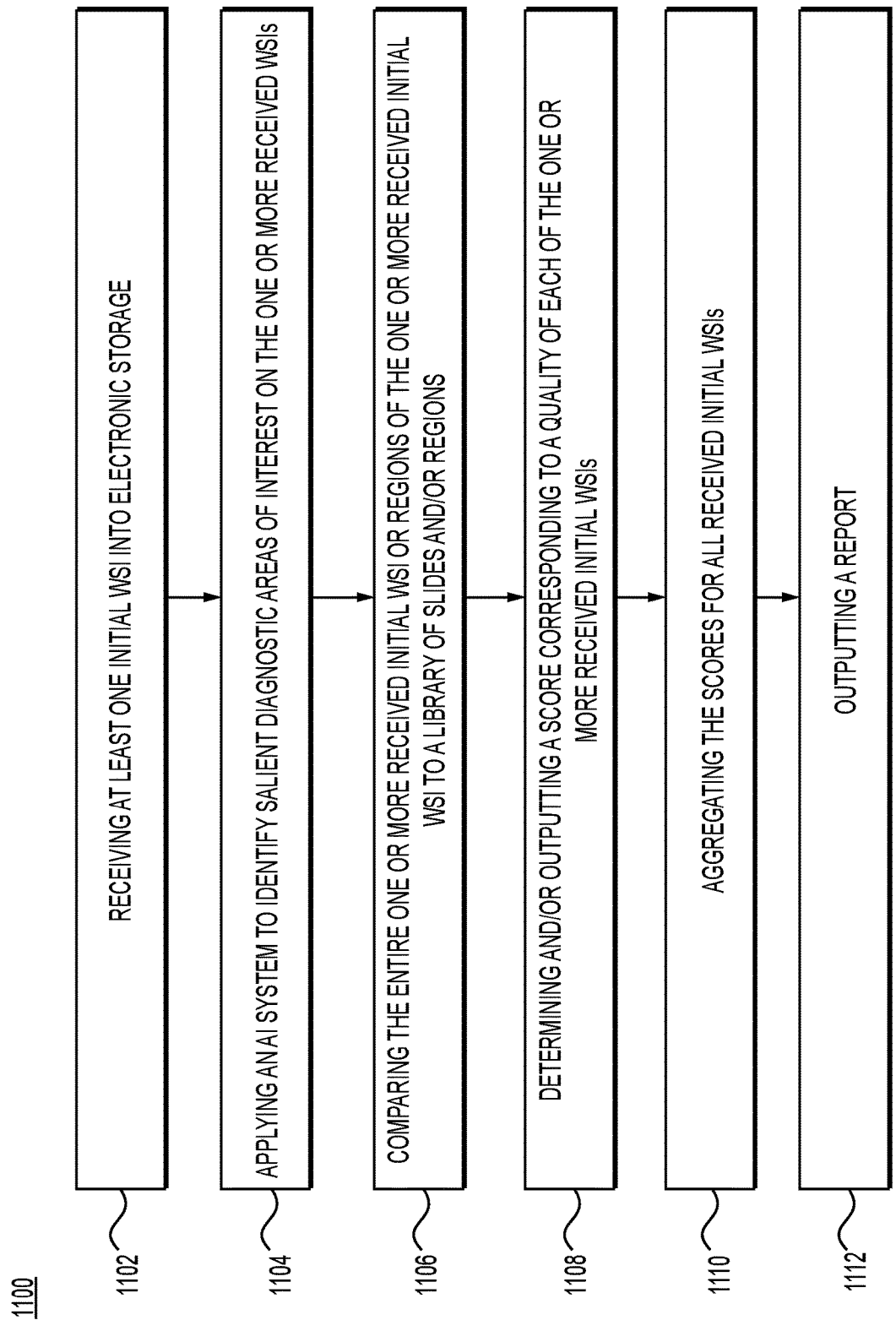
FIG. 11 is an exemplary flow chart illustrating a process for determining a slide quality, according to an exemplary embodiment of the present disclosure.

As shown in FIG. 11, method 1100 of assessing a site's quality in preparing digital WSIs may include, at step 1102, receiving one or more (e.g., a set of) initial WSIs into electronic storage (e.g., RAM, hard drive, cloud storage, etc.). The initial WSIs may have been digitized by a digital pathology scanner at a site to be assessed.

The method 1100 may include a step 1104 of applying an AI system to identify salient diagnostic areas of interest on the one or more received initial WSIs. The AI system may be at the site to be assessed.

The method 1100 may include a step 1106 of comparing the entire one or more received initial WSI or regions of the one or more received initial WSI (e.g., the identified salient diagnostic areas of interest) to a library of slides and/or regions created and/or maintained using the received set of WSIs.

The method 1100 may include a step 1108 of determining, based on the comparison) and/or outputting (e.g., to a display and/or electronic storage) a score and/or a binary output that may correspond to or categorize a quality of each of the one or more received initial WSIs (e.g., poor, good, borderline). The method 1100 may include a step 1110 of aggregating the scores for all received initial WSIs and a step 1112 of outputting (e.g., to a display and/or electronic storage) a report. The report may include the aggregated scores and/or a summary or other metric corresponding to the site's level of quality that is based on the aggregated scores.

Techniques disclosed herein contemplate using an AI system or machine learning model to introduce artifacts, defects, or other preanalytic features to create synthetic WSIs. As an alternative to using an AI system to create synthetic WSIs, tissue may be manually, physically prepared and stained in different ways to represent potential preanalytic variation to create synthetic WSIs. However, this manual preparation might not necessarily simulate any combination of variability on a same plane of tissue. Techniques disclosed herein may apply modifications and/or introduce artifacts, defects, or other preanalytic features or augmentations on a same plane of the tissue. The introduced artifacts, defects, or other preanalytic features or augmentations may be configured to enhance or reduce slide quality or clarity and may include, but are not limited to: a presence or absence artifacts, hair artifacts, cracks, bubbles, dust, dirt, ink, scanlines, folds, or scratches; a thickness or thinness of a slide, a thickness or thinness of a slice of a sample, a slide clarity, a stain intensity, a fixation quality, and/or a slide color.

Figure 12:
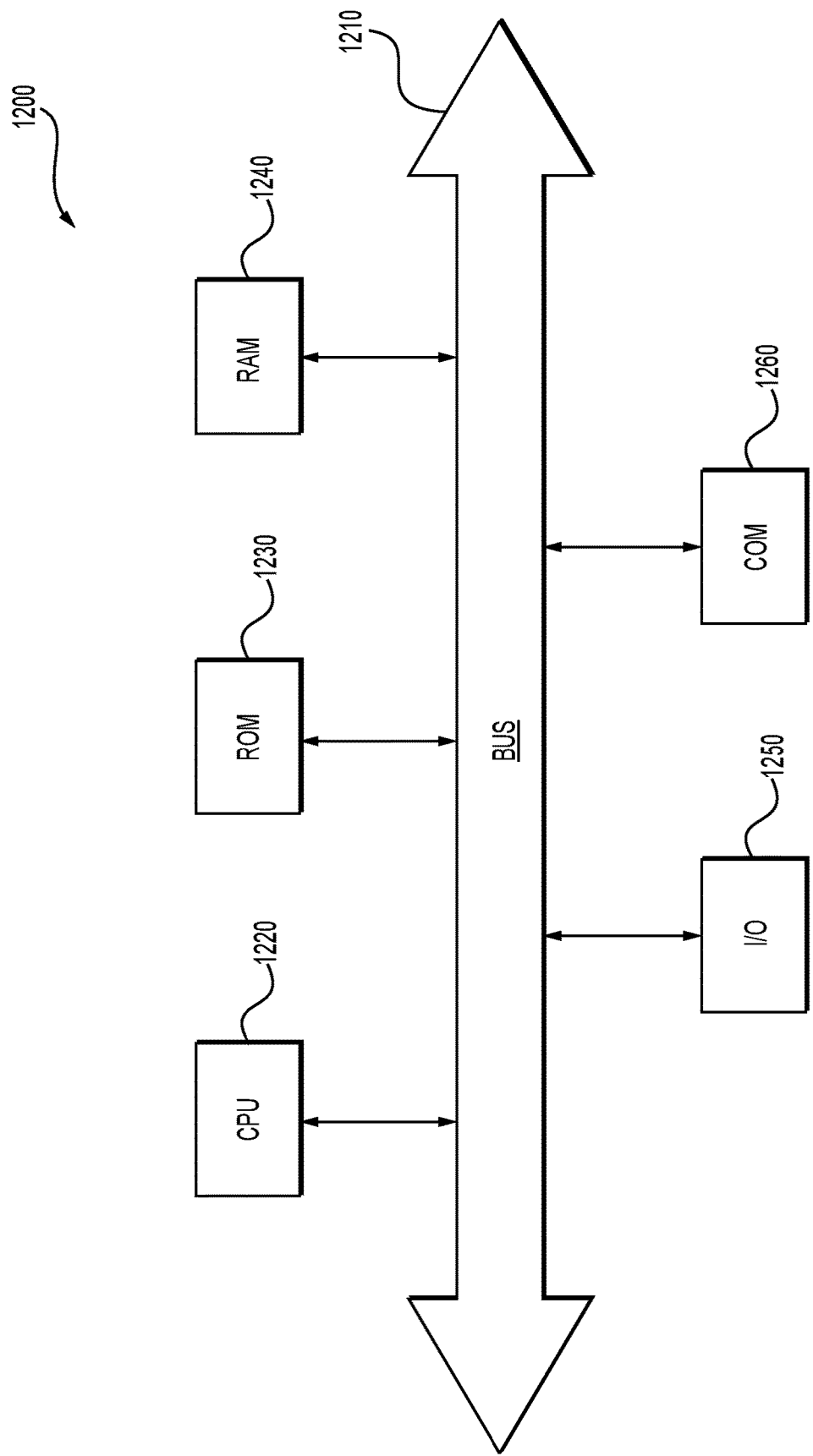
FIG. 12 depicts an example of a computing device that may execute techniques presented herein, according to one or more embodiments.

Referring to FIG. 12, a device 1200 may include a central processing unit (CPU) 1220. CPU 1220 may be any type of processing device including, for example, any type of special purpose or a general-purpose microprocessor device. As will be appreciated by persons skilled in the relevant art, CPU 1220 also may be a single processor in a multi-core/multiprocessor system, such system operating alone, or in a cluster of computing devices operating in a cluster or server farm. CPU 1220 may be connected to a data communication infrastructure 1210, for example a bus, message queue, network, or multi-core message-passing scheme.

Device 1200 may also include a main memory 1240, for example, random access memory (RAM), and may also include a secondary memory 1230. Secondary memory 1230, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 1230 may include similar means for allowing computer programs or other instructions to be loaded into device 1200. Examples of such means may include a program cartridge and cartridge interface (such as that found in video game devices), a removable memory chip (such as an EPROM or PROM) and associated socket, and other removable storage units and interfaces, which allow software and data to be transferred from a removable storage unit to device 1200.

Device 1200 also may include a communications interface ("COM") 1260. Communications interface 1260 allows software and data to be transferred between device 1200 and external devices. Communications interface 1260 may include a model, a network interface (such as an Ethernet card), a communications, a PCMCIA slot and card, or the like. Software and data transferred via communications interface 1260 may in the form of signals, which may be electronic, electromagnetic, optical or other signals capable of being received by communications interface 1260. These signals may be provided to communications interface 1260 via a communications path of device 1200, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. Device 1200 may also include input and output ports 1250 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Throughout this disclosure, references to components or modules generally refer to items that logically may be grouped together to perform a function or group of related functions. Like reference numerals are generally intended to refer to the same or similar components. Components and/or modules may be implemented in software, hardware, or a combination of software and/or hardware.

The tools, modules, and/or functions described above may be performed by one or more processors. "Storage" type media may include any or all of the tangible memory of the computers, processors or the like, or associated modules thereof, such as various semiconductor memories, tape drives, disk drives and the like, which may provide non-transitory storage at any time for software programming.

Software may be communicated through the Internet, a cloud service provider, or other telecommunication networks. For example, communications may enable loading software from one computer or processor into another. As used herein, unless restricted to non-transitory, tangible "storage" media, terms such as computer or machine "readable medium" refer to any medium that participates in providing instructions to a processor for execution.

The foregoing general description is exemplary and explanatory only, and not restrictive of the disclosure. Other embodiments of the invention may be apparent to those skilled in the art from consideration of the specification and practice of the invention disclosed herein. It is intended that the specification and examples be considered as exemplary only.

What is claimed is:

1. A computer-implemented method for processing electronic medical images, comprising:
  receiving an initial whole slide image of a pathology specimen, the pathology specimen being associated with a patient;

receiving information about slide quality aspects to modify; and generating a synthetic whole slide image by applying a machine learning model to modify the received initial whole slide image according to the received information, wherein the synthetic whole slide image has a reduced quality as compared to the initial whole slide image.

2. The method of claim 1, wherein receiving information about slide quality aspects to modify includes receiving information about a desired artifact, hair artifact, crack, bubble, dust, dirt, ink scanline, fold, scratch, slice thickness, stain intensity, slide clarity, fixation quality, and/or slide color.

3. The method of claim 1, wherein receiving an initial whole slide image includes receiving a plurality of initial whole slide images, and wherein generating the synthetic whole slide image includes generating a plurality of synthetic whole slide images, and wherein the method further comprises training a diagnostic machine learning system using the plurality of synthetic whole slide images.

4. The method of claim 1, wherein receiving information about slide quality aspects to modify includes receiving at least one target whole slide image, the target whole slide image having at least one predetermined defect.

5. The method of claim 4, wherein generating the synthetic whole slide image by applying the machine learning model includes using a pre-trained neural network to apply neural style transfer to transform the initial whole slide image into the generated whole slide image such that the generated whole slide image includes the predetermined defect.

6. The method of claim 4, wherein receiving information about slide quality aspects to modify includes receiving at least one pixel-wise annotation with the at least one target whole slide image, wherein the pixel-wise annotation is indicative of an artifact location in the target whole slide image.

7. The method of claim 6, wherein generating the synthetic whole slide image by applying the machine learning model includes segmenting an artifact and introducing the segmented artifact into the initial whole slide image.

8. The method of claim 7, further comprising modifying the segmented artifact.

9. The method of claim 7, further comprising determining one or more locations of the initial whole slide image to introduce the artifact.

10. The method of claim 1, wherein receiving information about slide quality aspects to modify includes receiving at least one target variable indicative of a predetermined defect.

11. The method of claim 10, wherein generating the synthetic whole slide image by applying the machine learning model includes using a pre-trained neural network to apply conditional image augmentation to transform the initial whole slide image into the generated whole slide image such that the generated whole slide image includes the predetermined defect.

12. The method of claim 1, further comprising:
determining at least one salient diagnostic area of interest on the received initial whole slide image; and
determining whether the generated synthetic whole slide image has a sufficient quality for use in a primary diagnosis.

13. The method of claim 1, further comprising categorizing the generated synthetic whole slide image by tissue type, stain type, diagnosis, quality, or a type of defect or artifact introduced.

14. The method of claim 1, wherein receiving information about slide quality aspects to modify includes receiving information about a site's specimen transfer and/or slide preparation protocol.

15. The method of claim 1, wherein receiving information about slide quality aspects to modify includes receiving information about a condition, and wherein generating the synthetic whole slide image by applying the machine learning model includes repeatedly modifying the initial whole slide image until the condition is satisfied.

16. The method of claim 15, further comprising determining a measure of generalization of the received initial whole slide image based on an extent of modifications performed to satisfy the condition.

17. The method of claim 1, further comprising:
running a diagnostic system on the generated synthetic whole slide image to determine a diagnosis or a salient diagnostic area of interest; and
determining one or more performance characteristics of the diagnostic system based on a determination by the diagnostic system.

18. The method of claim 1, further comprising outputting the generated whole slide image to electronic storage and/or a display.

19. A system for processing electronic medical images, the system comprising:
at least one memory storing instructions; and
at least one processor configured to execute the instructions to perform operations comprising:
receiving an initial whole slide image of a pathology specimen, the pathology specimen being associated with a patient;
receiving information about slide quality aspects to modify; and
generating a synthetic whole slide image by applying a machine learning model to modify the received initial whole slide image according to the received information, wherein the synthetic whole slide image has a reduced quality as compared to the initial whole slide image.

20. A non-transitory computer-readable medium storing instructions that, when executed by a processor, perform operations processing electronic medical images, the operations comprising:
receiving an initial whole slide image of a pathology specimen, the pathology specimen being associated with a patient;
receiving information about slide quality aspects to modify; and
generating a synthetic whole slide image by applying a machine learning model to modify the received initial whole slide image according to the received information, wherein the synthetic whole slide image has a reduced quality as compared to the initial whole slide image.

* * * * *